United States Patent
Tsai et al.

(10) Patent No.: US 12,445,050 B2
(45) Date of Patent: Oct. 14, 2025

(54) VOLTAGE CONVERTER WITH REDUCED INDUCTIVE ENERGY CONVERSION

(71) Applicant: INDUSTRIAL TECHNOLOGY RESEARCH INSTITUTE, Hsinchu (TW)

(72) Inventors: Wen-Tien Tsai, Liuqiu Township (TW); Geng-You Ke, Taoyuan (TW); Chao-Wei Wang, Zhudong Township (TW); Ching-Ran Lee, Jinning Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 239 days.

(21) Appl. No.: 18/080,877

(22) Filed: Dec. 14, 2022

(65) Prior Publication Data
US 2024/0204660 A1   Jun. 20, 2024

(51) Int. Cl.
*H02M 3/07* (2006.01)
(52) U.S. Cl.
CPC .................................. *H02M 3/07* (2013.01)
(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS

| 9,559,589 B2 * | 1/2017 | Petersen ................ H05B 45/38 |
| 9,831,775 B2 | 11/2017 | Doering |

(Continued)

FOREIGN PATENT DOCUMENTS

| EP | 2 824 816 A1 | 1/2015 |
| EP | 2 905 885 A1 | 8/2015 |

(Continued)

OTHER PUBLICATIONS

Chang et al., "A Gain/Efficiency-Improved Serial-Parallel Switched-Capacitor Step-Up DC-DC Converter", IEEE Transactions on Circuits and Systems—I: Regular Papers, vol. 60, No. 10, Oct. 2013, pp. 2799-2809.

(Continued)

*Primary Examiner* — Sean Kayes
*Assistant Examiner* — Nusrat Quddus
(74) *Attorney, Agent, or Firm* — Birch, Stewart, Kolasch & Birch, LLP

(57) ABSTRACT

A voltage converter is connected with a load. The voltage converter includes a power source, a first switching element, a second switching element, an energy storage inductor, an energy storage capacitor and N capacitor modules. The first switching element is connected between a first terminal of the power source and a first node. The second switching element is connected between the first node and a second node. A second terminal of the power source is connected with the second node. The energy storage inductor is connected between the first node and the third node. The N capacitor modules are connected between the third node and a fourth node, wherein N is a positive integer. The energy storage capacitor is connected between the fourth node and the second node.

7 Claims, 12 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 7/519; H02M 7/521; H02M 7/523; H02M 7/75; H02M 7/757; H02M 7/7575; H02M 7/66; H02M 7/68; H02M 7/72; H02M 7/483; H02M 2007/4835; H02M 7/487; H02M 1/08; H02M 1/084; H02M 1/0845; H02M 7/515; H02M 7/525; H02M 7/527; H02M 7/529; H02M 7/539; H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 3/1584; H02M 3/285; H02M 3/33561; H02M 7/49; H02M 1/045; H02M 7/006; H02M 7/06; H02M 7/068; H02M 7/153; H02M 7/19; H02M 7/08; H02M 7/17; H02M 7/493; H02M 7/53806; H02M 7/5381; H02M 7/217; H02M 7/538466; H02M 7/5387; H02M 7/53871; H02M 7/53873; H02M 7/53875; H05B 39/048; B23K 11/24; H04B 2215/069; H02J 3/46; H02J 3/38
See application file for complete search history.

(56) References Cited

U.S. PATENT DOCUMENTS

| | | | | |
|---|---|---|---|---|
| 9,831,776 B1* | 11/2017 | Jiang | ............ | H02M 1/15 |
| 10,122,256 B1* | 11/2018 | Babazadeh | ............ | H02M 3/18 |
| 10,651,731 B1* | 5/2020 | Rainer | ............ | H02M 3/1588 |
| 10,680,512 B2* | 6/2020 | Babazadeh | ............ | H05B 45/3725 |
| 10,781,793 B2* | 9/2020 | Demuth | ............ | F03D 7/047 |
| 10,811,962 B2 | 10/2020 | Chuang et al. | | |
| 10,848,070 B2* | 11/2020 | Li | ............ | H02M 3/3376 |
| 11,515,793 B2* | 11/2022 | Cannillo | ............ | H02M 1/0095 |
| 11,552,547 B2* | 1/2023 | Liu | ............ | H02M 1/0058 |
| 11,646,654 B2* | 5/2023 | Liu | ............ | H02M 3/01 323/282 |
| 11,671,002 B2* | 6/2023 | Liu | ............ | H02M 3/07 323/272 |
| 11,736,007 B2* | 8/2023 | Liu | ............ | H02M 3/01 323/282 |
| 11,736,035 B2* | 8/2023 | Zhan | ............ | H02M 3/072 363/17 |
| 12,136,876 B2* | 11/2024 | Liu | ............ | H02M 3/158 |
| 2010/0165686 A1* | 7/2010 | Matzberger | ............ | H02M 7/219 363/127 |
| 2014/0268946 A1* | 9/2014 | Liu | ............ | H02M 3/07 363/60 |
| 2017/0250603 A1 | 8/2017 | Doering | | |
| 2022/0190714 A1* | 6/2022 | Ye | ............ | H02M 3/07 |
| 2023/0013025 A1* | 1/2023 | Kumar | ............ | H02M 1/0095 |
| 2023/0268835 A1* | 8/2023 | Lesso | ............ | H02M 3/1582 323/271 |
| 2023/0396144 A1* | 12/2023 | Ge | ............ | H02M 1/0095 |
| 2023/0412073 A1* | 12/2023 | Ge | ............ | H02M 3/077 |
| 2024/0128864 A1* | 4/2024 | Ye | ............ | H02M 1/0058 |
| 2025/0038642 A1* | 1/2025 | Melanson | ............ | H04R 3/00 |

FOREIGN PATENT DOCUMENTS

| | | |
|---|---|---|
| TW | I742914 B | 10/2021 |
| WO | WO 2016/038601 A1 | 3/2016 |
| WO | WO 2018/233871 A1 | 12/2018 |
| WO | WO 2022/062425 A1 | 3/2022 |

OTHER PUBLICATIONS

Nicoli et al., "A Series-Parallel Switched Capacitor Step-Up DC-DC Converter and its Gate-Control Circuits for Over the Supply Rail Switches", IEEE Xplore, Jun. 21, 2015, pp. 1-4.

Seo et al., "Dual Inductor Hybrid Converter for Point-of-Load Voltage Regulator Modules", IEEE Transactions on Industry Applications, vol. 56, No. 1, Jan./Feb. 2020, pp. 367-377.

Taiwanese Office Action and Search Report for Taiwanese Application No. 111148066, dated Dec. 19, 2023.

* cited by examiner

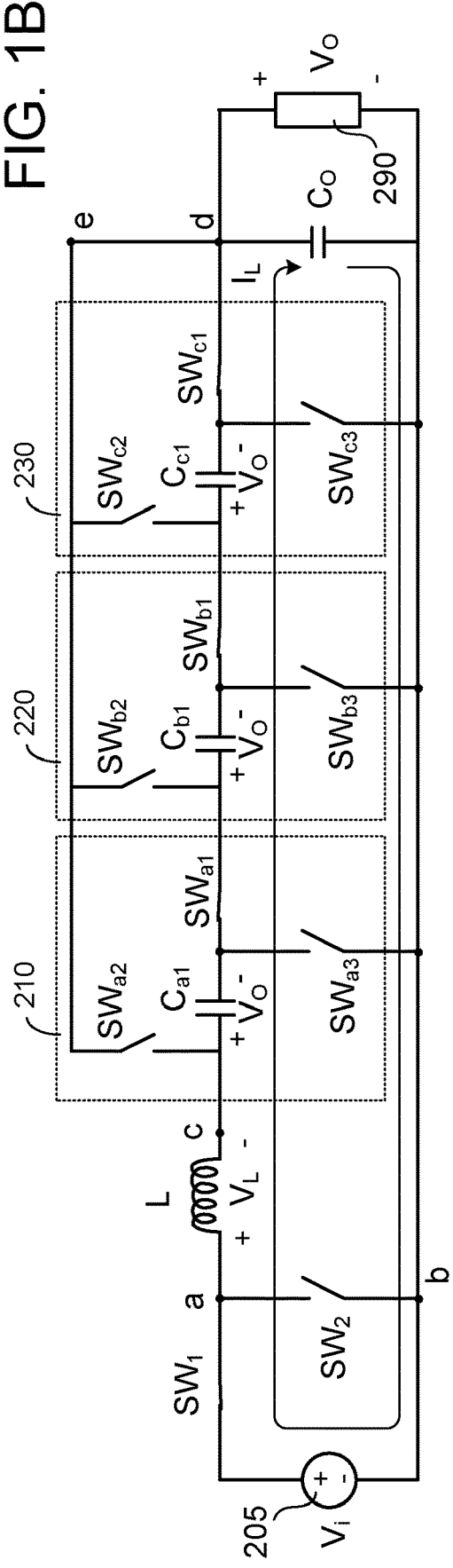
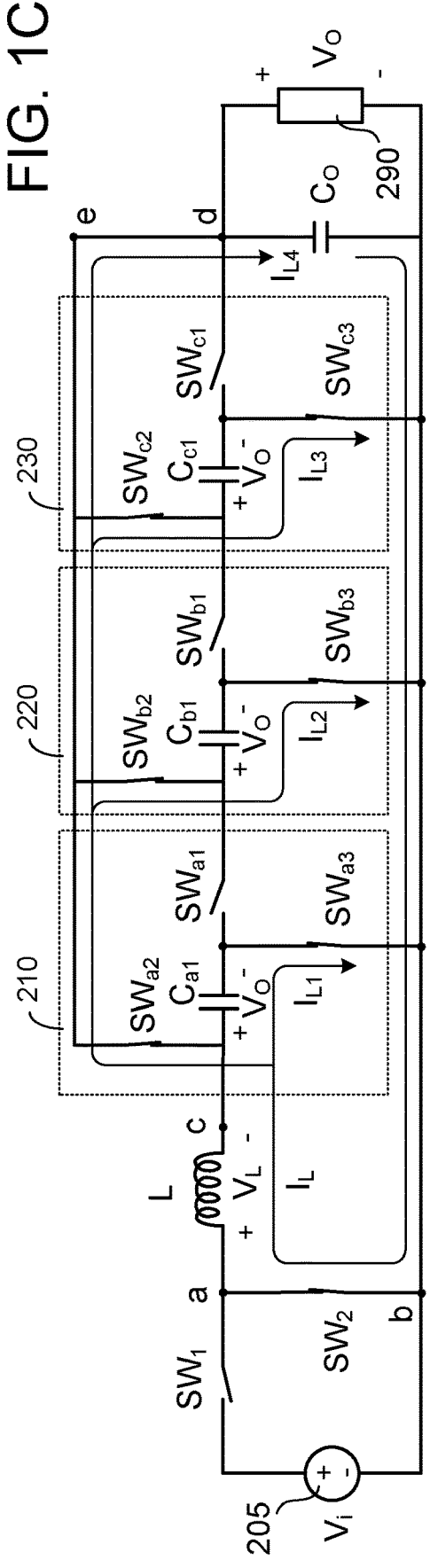
FIG. 1B
FIG. 1C

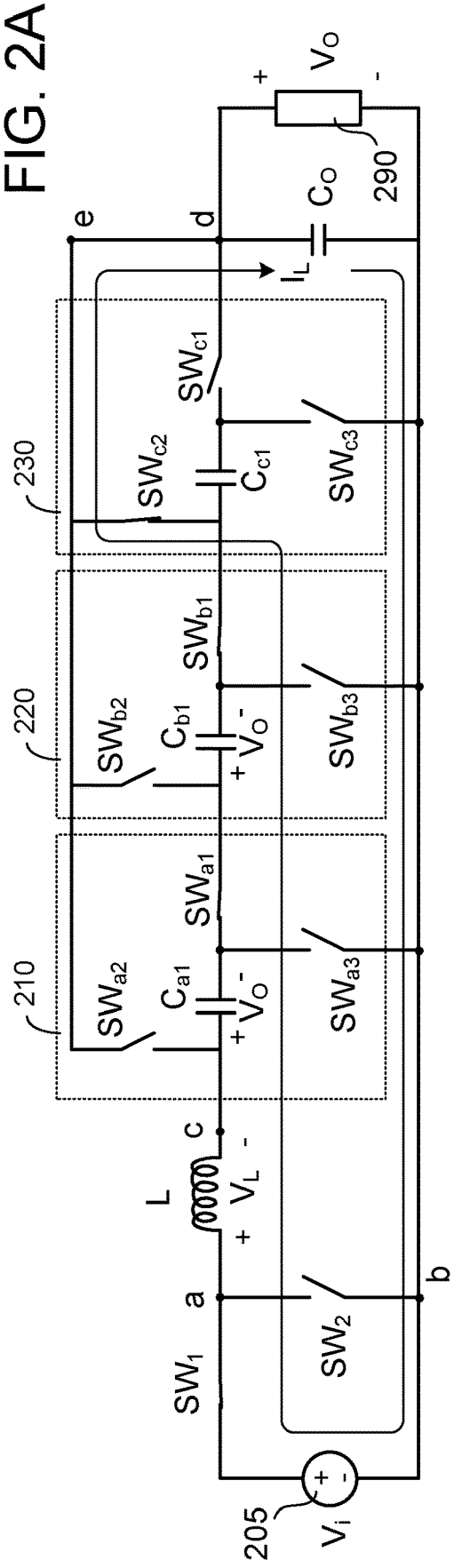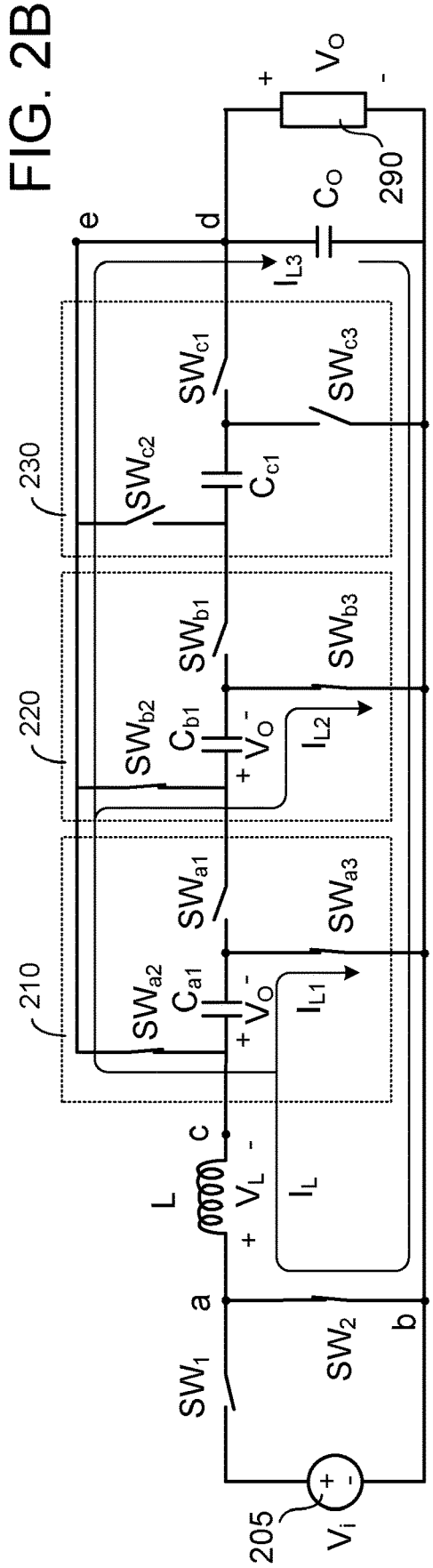

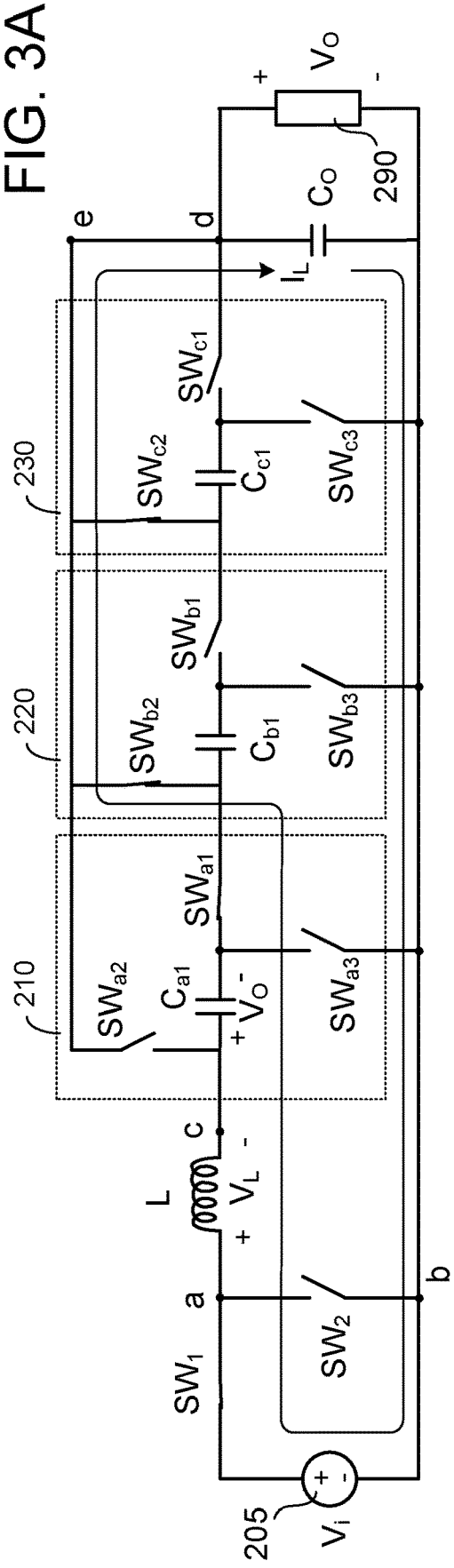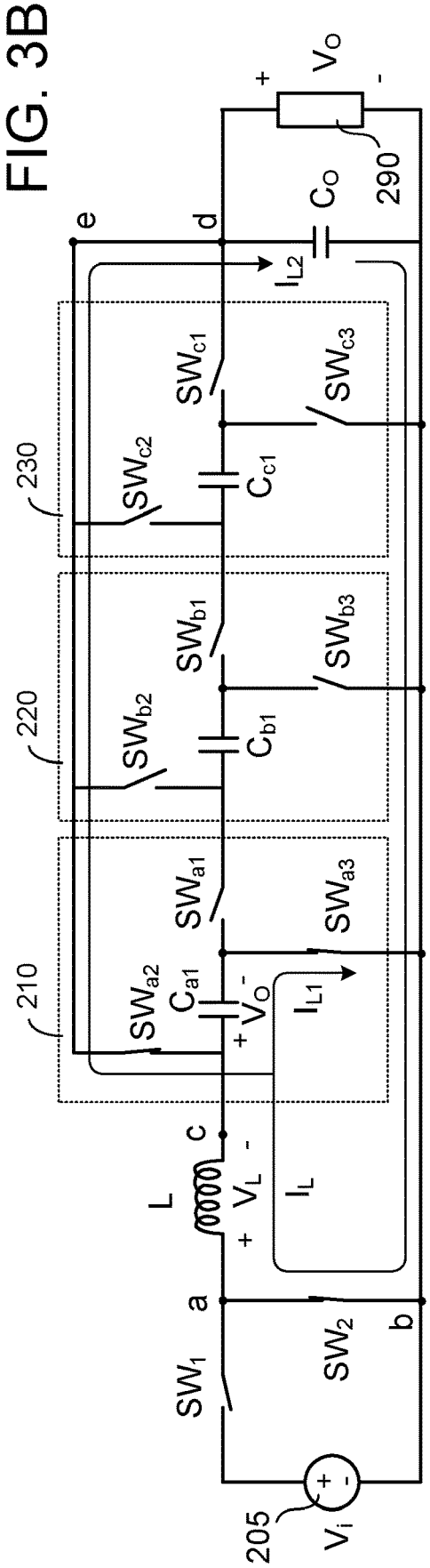

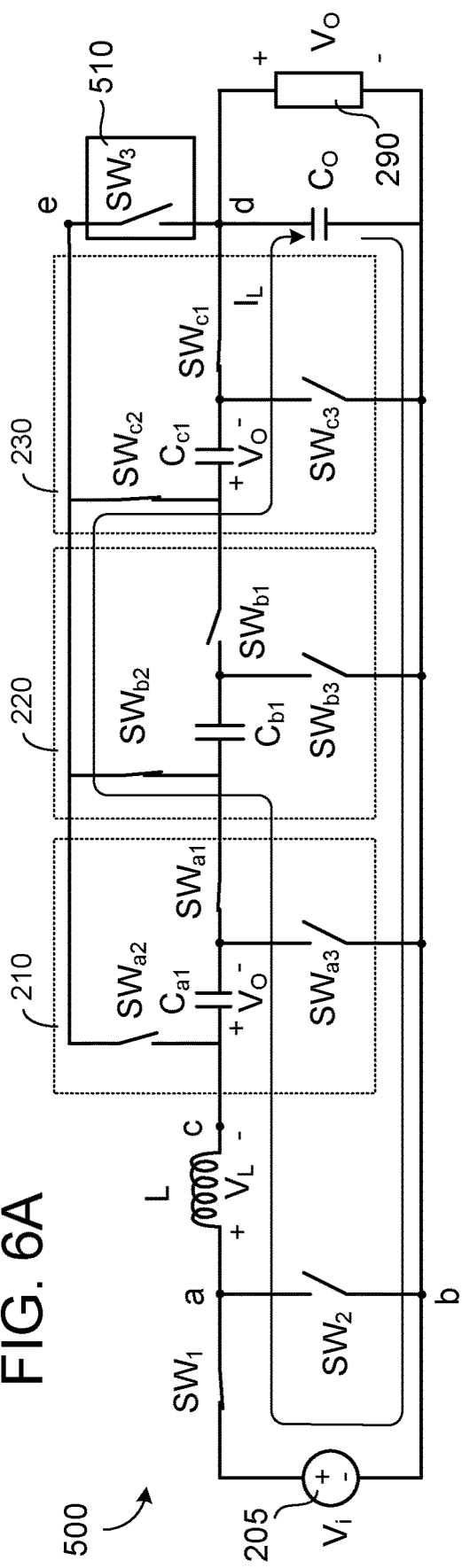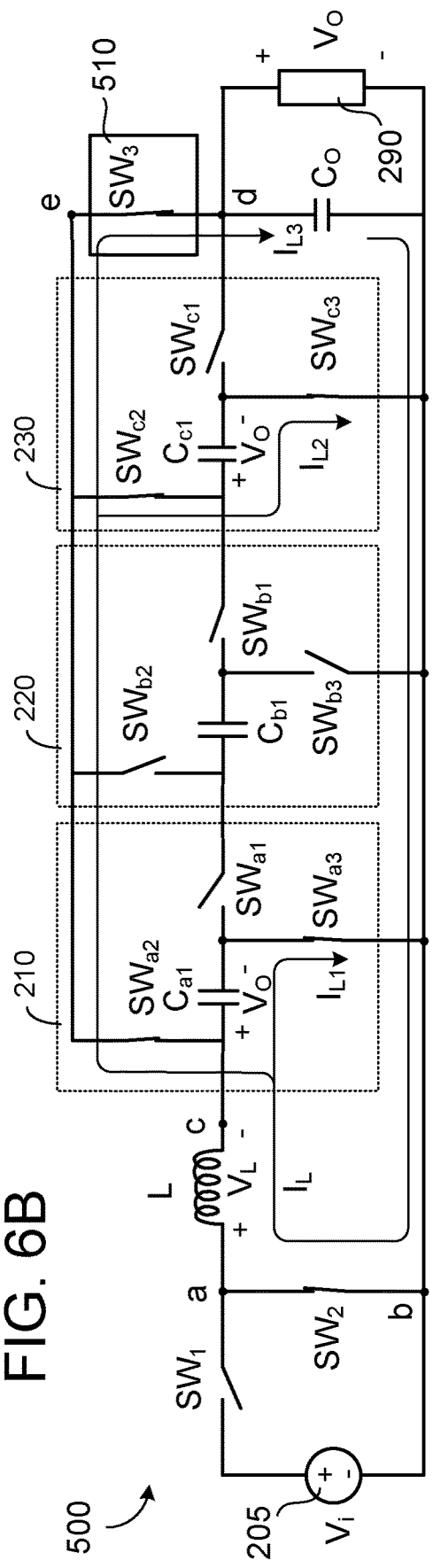

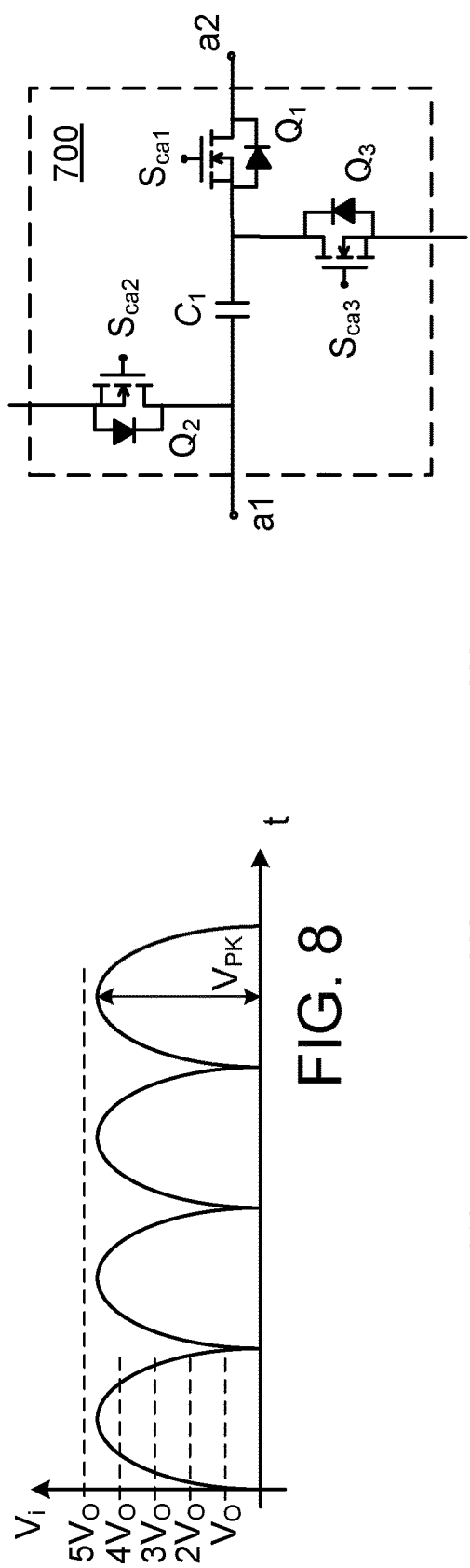
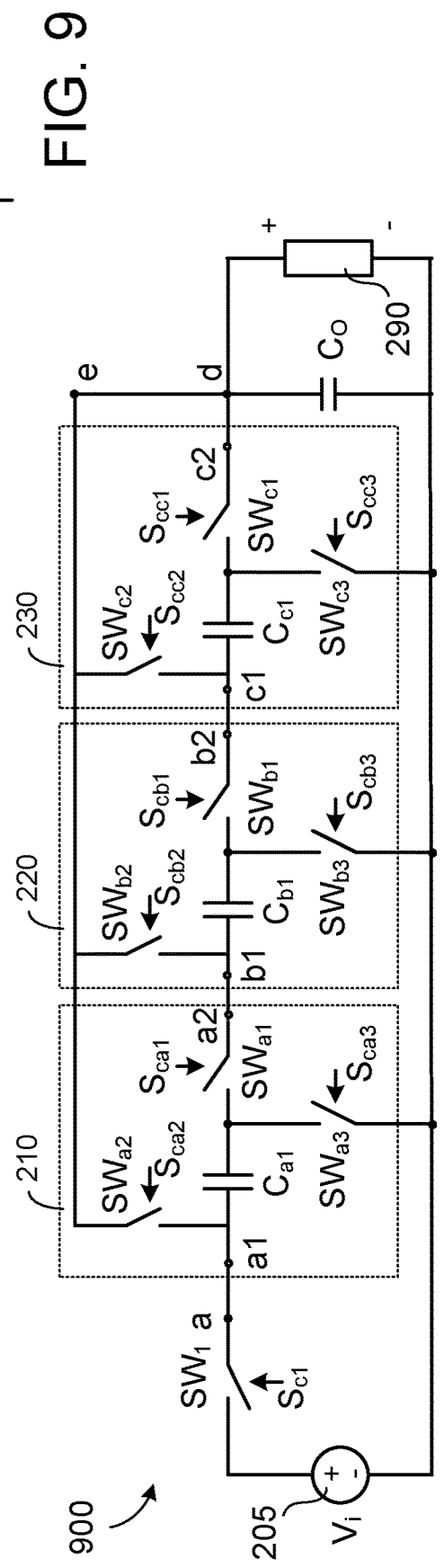

US 12,445,050 B2

VOLTAGE CONVERTER WITH REDUCED INDUCTIVE ENERGY CONVERSION

TECHNICAL FIELD

The present application relates to a voltage converter, and more particularly to a voltage converter with reduced inductive energy conversion.

BACKGROUND

With the advancement of power electronics and semiconductor technology, the requirements for the performance and convenience of power supplies are increased. In order to achieve the purposes, it is important to enhance the power density. In order to increase the power density, many researchers focused on the studies about wide-bandgap components. For example, in the conventional power converter, the silicon-based power components (e.g., MOSFET transistors or IGBT transistors) are gradually replaced by gallium nitride (GaN) transistors or silicon carbide (SiC) transistors. Due to the improvement of component material, the magnetic element can be operated at the higher working frequency. Consequently, the volume of the magnetic element can be reduced, and the power density can be enhanced. However, as the working frequency is increased, the noise interference (e.g., electromagnetic interference) becomes more obvious. Therefore, it is important to provide a voltage converter with reduced inductor volume and reduced inductive energy conversion.

SUMMARY

An embodiment of the present application provides a voltage converter. The voltage converter is connected with a load. The voltage converter provides an output voltage to the load. The voltage converter includes a power source, a first switching element, a second switching element, an energy storage inductor, N capacitor modules and an energy storage capacitor. The power source provides an input voltage. The first switching element is connected between a first terminal of the power source and a first node. The second switching element is connected between the first node and a second node. A second terminal of the power source is connected with the second node. The energy storage inductor is connected between the first node and the third node. The N capacitor modules are connected between the third node and a fourth node, wherein N is a positive integer. The energy storage capacitor is connected between the second node and the fourth node. The load is connected between the second node and the fourth node. Each of the N capacitor modules includes a capacitor. When the voltage converter is in a first operating mode, a connection relationship between the N capacitor modules is controlled, and the energy storage inductor, the energy storage capacitor and the capacitor are connected with each other in series. Consequently, the energy storage inductor, the energy storage capacitor and the capacitor are charged by the input voltage. When the voltage converter is in a second operating mode, the connection relationship between the N capacitor modules is controlled, and the energy storage inductor, the energy storage capacitor and the capacitor are connected with each other in parallel. Consequently, the energy storage inductor discharges electricity and a stored energy in the energy storage inductor is transferred to the energy storage capacitor and the capacitor.

Another embodiment of the present application provides a voltage converter. The voltage converter is connected with a load. The voltage converter provides an output voltage to the load. The voltage converter includes a power source, a first switching element, an energy storage capacitor and N capacitor modules. The power source provides an input voltage. The first switching element is connected between a first terminal of the power source and a first node. The energy storage capacitor is connected between a second node and a third node. A second terminal of the power source is connected with the second node. The N capacitor modules are connected between the first node and the third node, wherein N is a positive integer. Each of the N capacitor modules includes a capacitor. When the voltage converter is in a first operating mode, a connection relationship between the N capacitor modules is controlled, and the energy storage capacitor and the capacitor are connected with each other in series. Consequently, the energy storage capacitor and the capacitor are charged by the input voltage. When the voltage converter is in a second operating mode, the connection relationship between the N capacitor modules is controlled, and the energy storage capacitor and the capacitor are connected with each other in parallel.

Numerous objects, features and advantages of the present application will be readily apparent upon a reading of the following detailed description of embodiments of the present application when taken in conjunction with the accompanying drawings. However, the drawings employed herein are for the purpose of descriptions and should not be regarded as limiting.

BRIEF DESCRIPTION OF THE DRAWINGS

FIGS. 1B and 1C are schematic circuit diagrams illustrating the operations of the voltage converter of the present application;

FIGS. 2A and 2B are schematic circuit diagrams illustrating the operations of the voltage converter of the present application in which two capacitor modules are enabled;

FIGS. 3A and 3B are schematic circuit diagrams illustrating the operations of the voltage converter of the present application, in which one capacitor module is enabled;

FIGS. 6A and 6B are schematic circuit diagrams illustrating the operations of the voltage converter of the second embodiment, in which the first capacitor module and the third capacitor module are selected to be in the enabled state;

FIG. 8 is a schematic timing waveform diagram illustrating the input voltage provided by a non-constant voltage power source;

FIG. 9 is a schematic circuit diagram illustrating a capacitor module using power transistors;

FIG. 10A is a schematic circuit diagram illustrating a voltage converter according to a third embodiment of the present application.

DETAILED DESCRIPTION OF PREFERRED EMBODIMENTS

The present application provides a voltage converter. The voltage converter comprises plural capacitor modules. The uses of the capacitor modules can reduce the inductor voltage of the energy storage inductor during the charging process. Consequently, the voltage across the energy storage inductor is reduced. Moreover, by controlling the switching action of the switching circuits in the capacitor modules, a portion of the energy originally stored in the energy storage inductor is transferred to the capacitor modules. Consequently, when compared with the conventional voltage converter, the inductive energy conversion of the voltage converter of the present application is reduced.

Figure 1A:
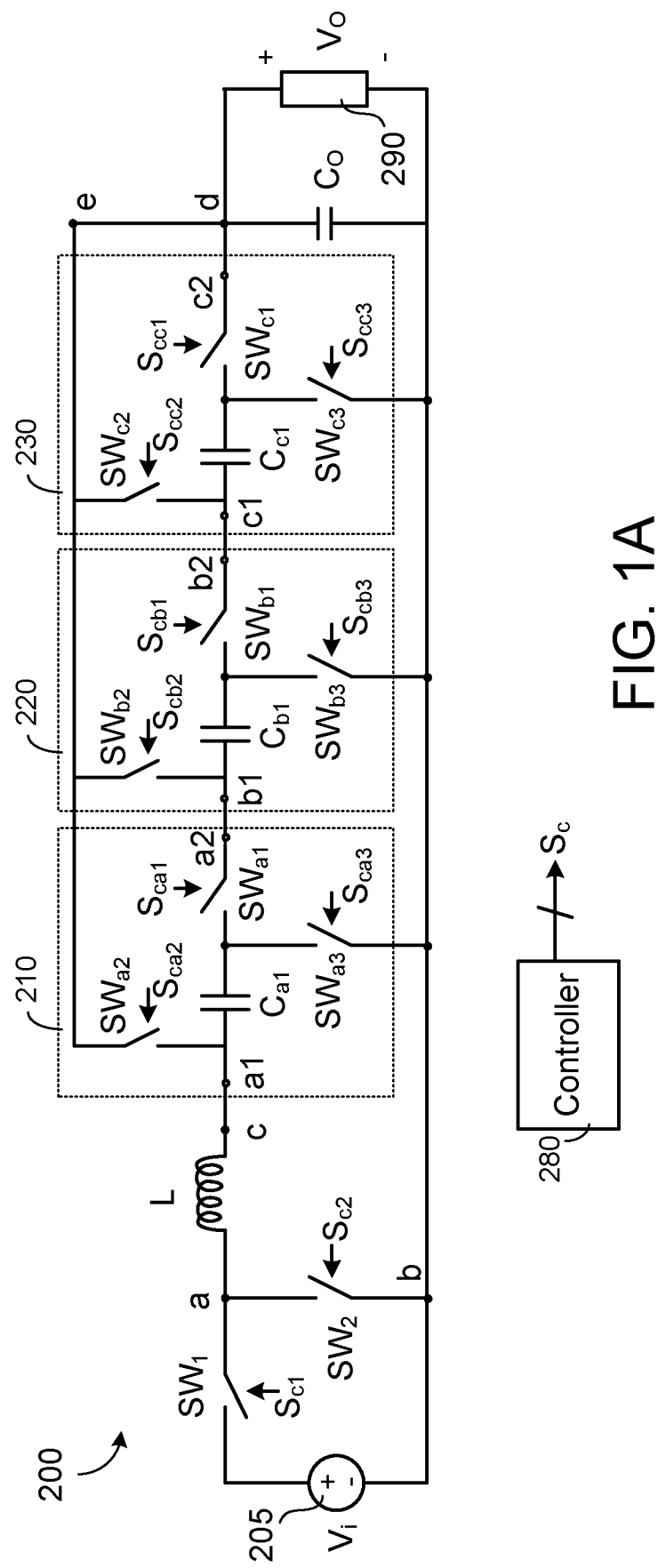
FIG. 1A is a schematic circuit diagram illustrating a voltage converter according to a first embodiment of the present application.

FIG. 1A is a schematic circuit diagram illustrating a voltage converter according to a first embodiment of the present application. The voltage converter 200 is connected with a load 290. In this embodiment, the voltage converter 200 comprises a power source 205, two switching elements $SW_1$, $SW_2$, an energy storage inductor L, an energy storage capacitor $C_O$ and plural capacitor modules 210~230. The power source 205 provides an input voltage $V_i$. The voltage converter 200 generates an output voltage $V_O$ to the load 290. In addition, the input voltage $V_i$ is lower than the output voltage $V_O$, i.e., $V_O < V_i$.

The switching element $SW_1$ is connected between the first terminal of the power source 205 and a node a. The switching element $SW_1$ receives a control signal $S_{c1}$. The switching element $SW_2$ is connected between the node a and a node b. The switching element $SW_2$ receives a control signal $S_{c2}$. The second terminal of the power source 205 is connected with the node b. The energy storage inductor L is connected between the node a and a node c. The energy storage capacitor $C_O$ is connected between a node d and the node b. Moreover, the node d is coupled with a node e. The load 290 is connected between the node d and the node b. The voltage of the energy storage capacitor $C_O$ and the voltage of the load 290 is similar to each other. That is, the voltage of the energy storage capacitor $C_O$ and the voltage of the load 290 (i.e., the output voltage $V_O$) are identical.

The three capacitor modules 210, 220 and 230 have the same circuitry structures. The first capacitor module 210 comprises a first end a1, a second end a2, a capacitor $C_{a1}$, a first switching circuit $SW_{a1}$, a second switching circuit $SW_{a2}$ and a third switching circuit $SW_{a3}$. The first end a1 of the first capacitor module 210 is connected with the node c. In addition, the first end a1 of the first capacitor module 210 is connected with the first terminal of the capacitor $C_{a1}$. The first switching circuit $SW_{a1}$ is connected between the second terminal of the capacitor $C_{a1}$ and the second end a2 of the first capacitor module 210. The second switching circuit $SW_{a2}$ is connected between the first end a1 of the first capacitor module 210 and the node e. The third switching circuit $SW_{a3}$ is connected between the second terminal of the capacitor $C_{a1}$ and the node b.

The second capacitor module 220 comprises a first end b1, a second end b2, a capacitor $C_{b1}$, a first switching circuit $SW_{b1}$, a second switching circuit $SW_{b2}$ and a third switching circuit $SW_{b3}$. The first end b1 of the second capacitor module 220 is connected with the second end a2 of the first capacitor module 210. In addition, the first end b1 of the second capacitor module 220 is connected with the first terminal of the capacitor $C_{b1}$. The first switching circuit $SW_{b1}$ is connected between the second terminal of the capacitor $C_{b1}$ and the second end b2 of the second capacitor module 220. The second switching circuit $SW_{b2}$ is connected between the first end b1 of the second capacitor module 220 and the node e. The third switching circuit $SW_{b3}$ is connected between the second terminal of the capacitor $C_{b1}$ and the node b.

The second capacitor module 230 comprises a first end c1, a second end c2, a capacitor $C_{c1}$, a first switching circuit $SW_{c1}$, a second switching circuit $SW_{c2}$ and a third switching circuit $SW_{c3}$. The first end c1 of the third capacitor module 230 is connected with the second end b2 of the second capacitor module 220. In addition, the first end c1 of the third capacitor module 230 is connected with the first terminal of the capacitor $C_{c1}$. The first switching circuit $SW_{c1}$ is connected between the second terminal of the capacitor $C_{c1}$ and the second end c2 of the third capacitor module 230. The second switching circuit $SW_{c2}$ is connected between the first end c1 of the third capacitor module 230 and the node e. The third switching circuit $SW_{c3}$ is connected between the second terminal of the capacitor $C_{c1}$ and the node b.

In this embodiment of the present application, the capacitance of the capacitor $C_{a1}$ of the first capacitor module 210, the capacitance of the capacitor $C_{b1}$ of the second capacitor module 220, the capacitance of the capacitor $C_{c1}$ of the third capacitor module 230 and the capacitance of the energy storage capacitor $C_O$ are equal. By controlling the on/off states of the switching circuits $SW_{a1} \sim SW_{a3}$, $SW_{b1} \sim SW_{b3}$ and $SW_{c1} \sim SW_{c3}$, the capacitors $C_{a1}$, $C_{b1}$ and $C_{c1}$ are selectively connected with the energy storage inductor L and the energy storage capacitor $C_O$ in series or in parallel.

The voltage converter 200 further comprises a controller 280. The controller 280 generates a control signal set $S_c$. The control signal set $S_c$ contains plural control signals $S_{c1} \sim S_{c2}$, $S_{ca1} \sim S_{ca3}$, $S_{cb1} \sim S_{cb3}$ and $S_{cc1} \sim S_{cc3}$ for controlling the connection statuses of the switching elements $SW_1 \sim SW_2$ and the switching circuits $SW_{a1} \sim SW_{a3}$, $SW_{b1} \sim SW_{b3}$ and $SW_{c1} \sim SW_{c3}$ in the voltage converter 200. When the voltage converter 200 is in the normal working state, the on or off states of the switching elements $SW_1 \sim SW_2$ and the switching circuits $SW_{a1} \sim SW_{a3}$, $SW_{b1} \sim SW_{b3}$ and $SW_{c1} \sim SW_{c3}$ are controlled by the controller 280. For brevity, the descriptions about the operations of the controller 280 and the control signals $S_{c1} \sim S_{c2}$, $S_{ca1} \sim S_{ca3}$, $S_{cb1} \sim S_{cb3}$ and $S_{cc1} \sim S_{cc3}$ are omitted. In order words, only the states of the switching elements $SW_1$~$SW_2$ and the switching circuits $SW_{a1}$~$SW_{a3}$, $SW_{b1}$~$SW_{b3}$ and $SW_{c1}$~$SW_{c3}$ will be described as follows.

FIGS. 1B and 1C are schematic circuit diagrams illustrating the operations of the voltage converter of the present application. When the voltage converter 200 is in the normal working state, the operating mode of the voltage converter 200 is switched between a first operating mode Mode1 and a second operating mode Mode2.

As shown in FIG. 1B, in the first operating mode Mode1, the switching element $SW_1$ is in the on state, and the switching element $SW_2$ is in the off state. In the three capacitor modules 210, 220 and 230, the first switching circuits $SW_{a1}$, $SW_{b1}$ and $SW_{c1}$ are in the on state, the second switching circuits $SW_{a2}$, $SW_{b2}$ and $SW_{c2}$ are in the off state, and the third switching circuits $SW_{a3}$, $SW_{b3}$ and $SW_{c3}$ are in the off state. Under this circumstance, the energy storage inductor L, the energy storage capacitor $C_O$ and the capacitors $C_{a1}$, $C_{b1}$ and $C_{c1}$ of the capacitor modules 210, 220 and 230 are connected with each other in series. The power source 205 provides the input voltage $V_i$ to charge the energy storage inductor L, the energy storage capacitor $C_O$ and the capacitors $C_{a1}$, $C_{b1}$ and $C_{c1}$. The inductor current $I_L$ of the energy storage inductor L increases. The inductor voltage $V_L$ is equal to ($V_i$-4$V_O$), i.e., $V_L=V_i-4V_O$. In other words, the first operating mode Mode1 is a charging mode.

As shown in FIG. 1C, in the second operating mode Mode2, the switching element $SW_2$ is in the on state, and the switching element $SW_1$ is in the off state. In the three capacitor modules 210, 220 and 230, the first switching circuits $SW_{a1}$, $SW_{b1}$ and $SW_{c1}$ are in the off state, the second switching circuits $SW_{a2}$, $SW_{b2}$ and $SW_{c2}$ are in the on state, and the third switching circuits $SW_{a3}$, $SW_{b3}$ and $SW_{c3}$ are in the on state. Under this circumstance, the energy storage inductor L, the energy storage capacitor $C_O$ and the capacitors $C_{a1}$, $C_{b1}$ and $C_{c1}$ of the capacitor modules 210, 220 and 230 are connected with each other in parallel. The energy storage inductor L discharges electricity. The inductor current $I_L$ of the energy storage inductor L is split into four currents $I_{L1}$~$I_{L4}$. That is, $I_{L1}=I_{L2}=I_{L3}=I_{L4}=I_L/4$. Meanwhile, the stored energy in the energy storage inductor L is transferred to the energy storage capacitor $C_O$ and the capacitors $C_{a1}$, $C_{b1}$ and $C_{c1}$. The inductor voltage $V_L$ of the energy storage inductor L is equal to (-$V_O$). That is, $V_L=-V_O$. In other words, the second operating mode Mode2 is a discharging mode.

Figure 1D:
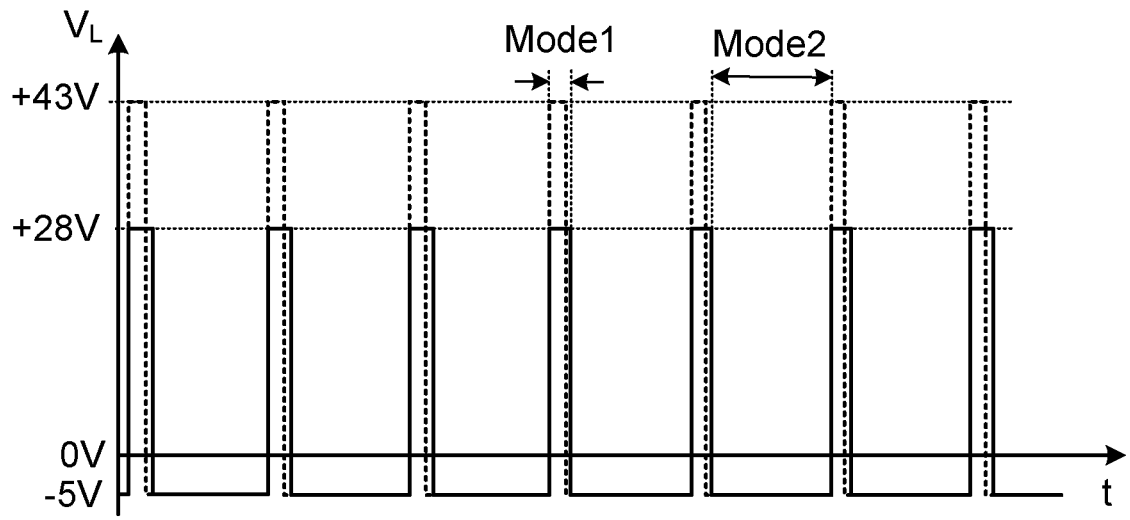
FIG. 1D is a schematic timing waveform diagram illustrating the change of the inductor voltage $V_L$ of the energy storage inductor L in the conventional voltage converter and the voltage converter of the present application.
Figure 1E:
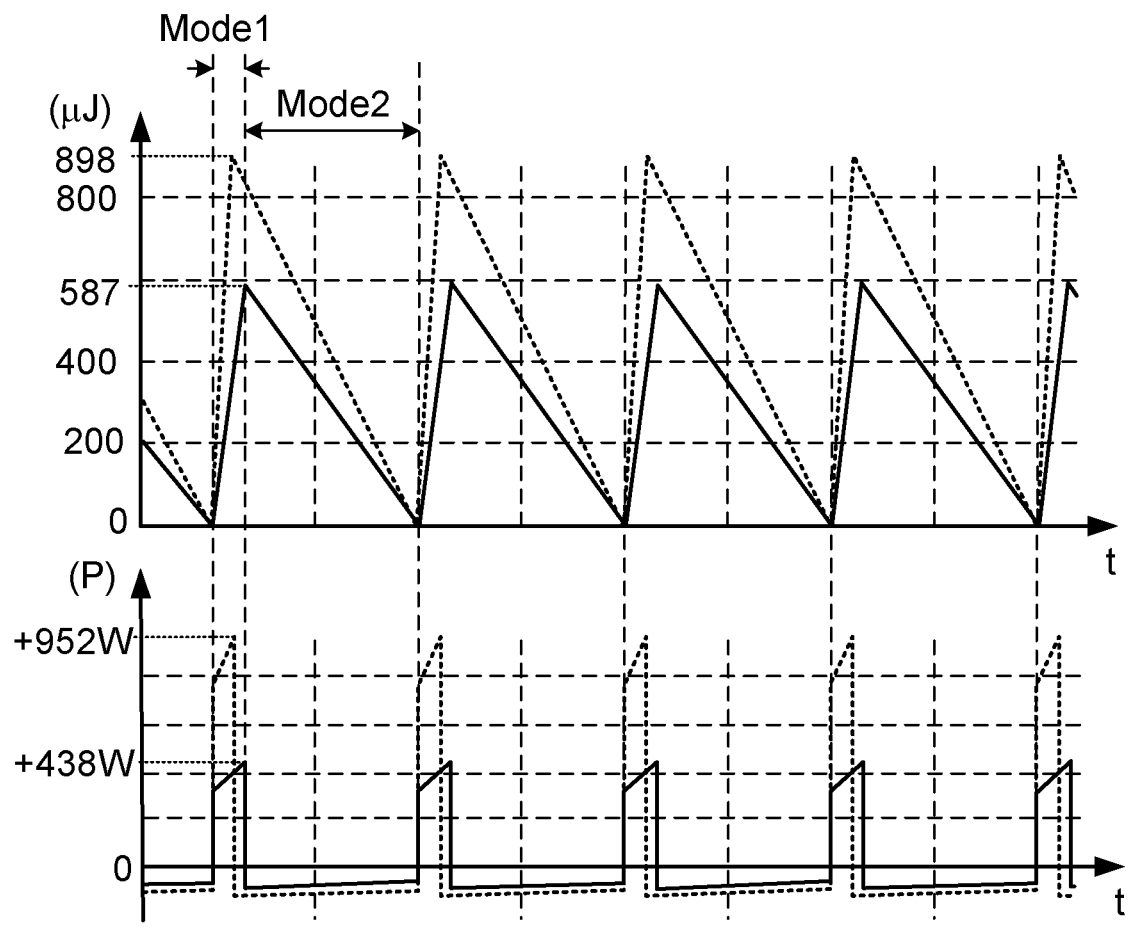
FIG. 1E is a schematic timing waveform diagram illustrating the changes of the inductor stored energy and the inductor power P of the energy storage inductor L in the conventional voltage converter and the voltage converter of the present application.

FIG. 1D is a schematic timing waveform diagram illustrating the change of the inductor voltage $V_L$ of the energy storage inductor L in the conventional voltage converter and the voltage converter of the present application. FIG. 1E is a schematic timing waveform diagram illustrating the changes of the inductor stored energy and the inductor power P of the energy storage inductor L in the conventional voltage converter and the voltage converter of the present application. In FIGS. 1D and 1E, the dotted lines represent the conventional voltage converter, and the solid lines represent the voltage converter of the present application. The conventional voltage converter comprises a power source, two switching elements, an energy storage inductor and an energy storage capacitor. In comparison with the voltage converter 200 of the present application, the conventional voltage converter is not equipped with the capacitor modules 210~230. The operating conditions of the voltage converter 200 of the present application and the conventional voltage converter include: 48V input voltage $V_i$, 5V output voltage $V_O$ and 100 W output power.

Please refer to the dotted lines shown in FIG. 1D. When the conventional voltage converter is operated in the first operating mode Mode1 (i.e., the charging mode), the inductor voltage $V_L$ is equal to +43V, i.e., $V_L=V_i-V_O=48-5$. Moreover, when the conventional voltage converter is operated in the second operating mode Mode2 (i.e., the discharging mode), the inductor voltage $V_L$ is equal to -5V. In the voltage converter 200 of the present application, all of the capacitor modules 210~230 are in the enabled state. Please refer to the sloid lines shown in FIG. 1D. When the voltage converter 200 of the present application is operated in the first operating mode Mode1 (i.e., the charging mode), the inductor voltage $V_L$ is equal to +28V, i.e., $V_L=V_i-4V_O=48-20$. When the voltage converter 200 of the present application is operated in the second operating mode Mode2 (i.e., the discharging mode), the inductor voltage $V_L$ is equal to -5V. Obviously, in the first operating mode Mode1, the inductor voltage $V_L$ can be effectively reduced by using the voltage converter 200 of the present application. In other words, the highest voltage across the energy storage inductor L is reduced.

Please refer to the dotted lines shown in FIG. 1E. When the conventional voltage converter is operated in the first operating mode Mode1 (i.e., the charging mode), the highest inductor power P of the energy storage inductor L is +952 W. In the voltage converter 200 of the present application, all of the capacitor modules 210~230 are in the enabled state. Please refer to the sloid lines shown in FIG. 1E. When the voltage converter 200 of the present application is operated in the first operating mode Mode1 (i.e., the charging mode), the highest inductor power P of the energy storage inductor L is +438 W. Moreover, in the first operating mode Mode1 (i.e., the charging mode), the integration of the inductor power P with respect to the working time t can obtains the inductor storage energy of the voltage converter 200 of the present application. The comparison between the inductor storage energy of the conventional voltage converter and the inductor storage energy of the voltage converter 200 of the present application can also be seen. The inductor storage energy of the voltage converter 200 of the present application is lower than the inductor storage energy of the conventional voltage converter. For example, the highest storage energy of the conventional voltage converter in each cycle is 898 μJ, and the highest storage energy of the voltage converter 200 of the present application in each cycle is 587 μJ. Obviously, the use of the voltage converter 200 of the present application can effectively reduce the inductive energy conversion of the energy storage inductor L.

In the situations of FIGS. 1B and 1C, the capacitor modules 210~230 are enabled according to the control signal set $S_c$ provided by the controller 280. In practice, the first capacitor module 210 and the second capacitor module 220 are enabled and the third capacitor module 230 are disabled according to the control signal set $S_c$ provided by the controller 280. In another variant example, the first capacitor module 210 is enabled and the second capacitor module 220 and the third capacitor module 230 are disabled according to the control signal set $S_c$ provided by the controller 280. In other words, any number of capacitor modules in the voltage converter 200 of the present application may be selected and operated to generate the output voltage $V_O$.

In case that a capacitor module is in the disabled state, the second switching circuit of the disabled capacitor module in the first operating mode is in the on state, and the second switching circuit of the disabled capacitor module in the second operating mode is in the off state. The first switching circuit and the third switching circuit of the disabled capacitor module in each of the first operating mode and the second operating mode are in the off state. Hereinafter, some implementation examples of the voltage converter 200 with different number of enabled capacitor modules will be described.

FIGS. 2A and 2B are schematic circuit diagrams illustrating the operations of the voltage converter of the present application, in which two capacitor modules are enabled. The first capacitor module 210 and the second capacitor module 220 are in an enabled state, and the third capacitor module 230 is in a disabled state.

As shown in FIG. 2A, in the first operating mode Mode1, the switching element $SW_1$ is in the on state, and the switching element $SW_2$ is in the off state. In the first capacitor module 210 and the second capacitor module 220, the first switching circuits $SW_{a1}$ and $SW_{b1}$ are in the on state, the second switching circuits $SW_{a2}$ and $SW_{b2}$ are in the off state, and the third switching circuit $SW_{a3}$ and $SW_{b3}$ are in the off state. In this embodiment, the third capacitor module 230 is in the disabled state. Consequently, in the third capacitor module 230, the second switching circuit $SW_{c2}$ is in the on state, and the first switch circuit $SW_{c1}$ and the third switching circuit $SW_{c3}$ are in the off state. Under this circumstance, the energy storage inductor L, the energy storage capacitor $C_O$, the capacitor $C_{a1}$ of the first capacitor module 210 and the capacitor $C_{b1}$ of the second capacitor module 220 are connected with each other in series. The power source 205 provides the input voltage $V_i$ to charge the energy storage inductor L, the energy storage capacitor $C_O$ and the capacitors $C_{a1}$ and $C_{b1}$. The inductor current $I_L$ of the energy storage inductor L increases. The inductor voltage $V_L$ is equal to $(V_i-3V_O)$, i.e., $V_L=V_i-3V_O$. In other words, the first operating mode Mode1 is a charging mode.

As shown in FIG. 2B, in the second operating mode Mode2, the switching element $SW_2$ is in the on state, and the switching element $SW_1$ is in the off state. In the first capacitor module 210 and the second capacitor module 220, the first switching circuits $SW_{a1}$ and $SW_{b1}$ are in the off state, the second switching circuits $SW_{a2}$ and $SW_{b2}$ are in the on state, and the third switching circuits $SW_{a3}$ and $SW_{b3}$ are in the on state. In this embodiment, the third capacitor module 230 is in the disabled state. Consequently, in the third capacitor module 230, the first switching circuit $SW_{c1}$, the second switching circuit $SW_{c2}$ and the third switching circuit $SW_{c3}$ are in the off state. Under this circumstance, the energy storage inductor L, the energy storage capacitor $C_O$, the capacitor $C_{a1}$ of the first capacitor module 210 and the capacitor $C_{b1}$ of the second capacitor module 220 are connected with each other in parallel. The energy storage inductor L discharges electricity. The inductor current $I_L$ of the energy storage inductor L is split into three currents $I_{L1} \sim I_{L3}$. That is, $I_{L1}=I_{L2}=I_{L3}=I_L/3$. Meanwhile, the stored energy of the energy storage inductor L is transmitted to the energy storage capacitor $C_O$ and the capacitors $C_{a1}$ and $C_{b1}$. The inductor voltage $V_L$ of the energy storage inductor L is equal to $(-V_O)$. That is, $V_L=-V_O$. In other words, the second operating mode Mode2 is a discharging mode.

Figure 2C:
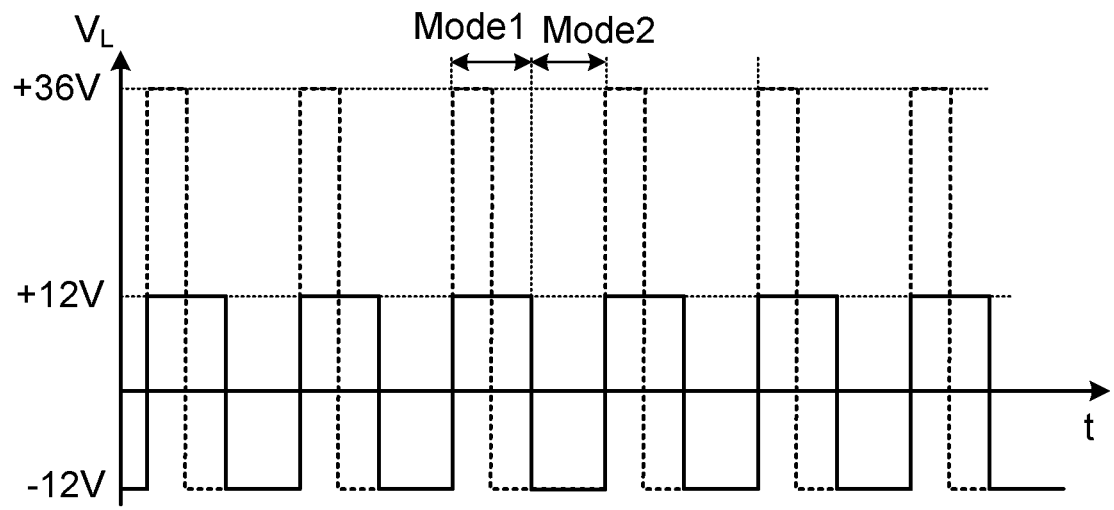
FIG. 2C is a schematic timing waveform diagram illustrating the change of the inductor voltage $V_L$ of the energy storage inductor L in the conventional voltage converter and the voltage converter of the present application.
Figure 2D:
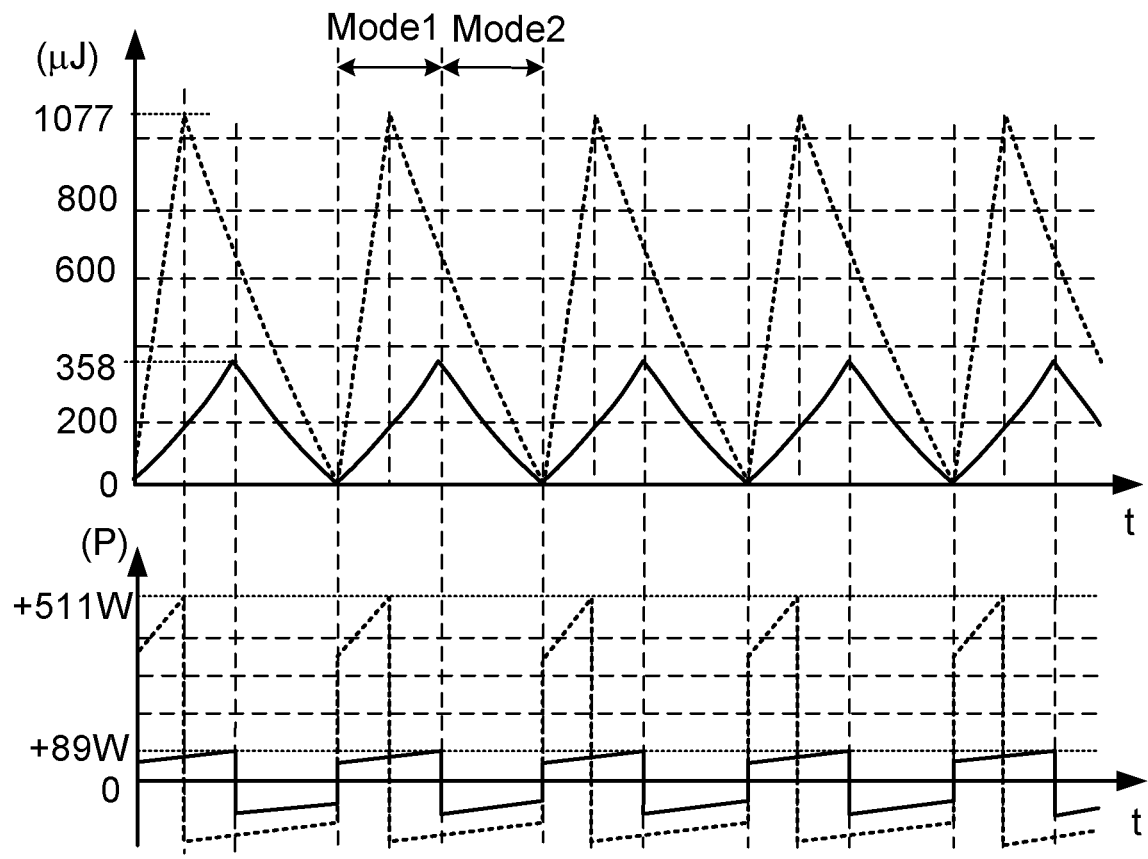
FIG. 2D is a schematic timing waveform diagram illustrating the changes of the inductor stored energy and the inductor power P of the energy storage inductor L in the conventional voltage converter and the voltage converter of the present application.

FIG. 2C is a schematic timing waveform diagram illustrating the change of the inductor voltage $V_L$ of the energy storage inductor L in the conventional voltage converter and the voltage converter of the present application. FIG. 2D is a schematic timing waveform diagram illustrating the changes of the inductor stored energy and the inductor power P of the energy storage inductor L in the conventional voltage converter and the voltage converter of the present application. The dotted lines represent the conventional voltage converter, and the solid lines represent the voltage converter of the present application. The conventional voltage converter comprises a power source, two switching elements, an energy storage inductor and an energy storage capacitor. In comparison with the voltage converter 200 of the present application, the conventional voltage converter is not equipped with the capacitor modules 210~230. The operating conditions of the voltage converter 200 of the present application and the conventional voltage converter include: 48V input voltage $V_i$, 12V output voltage $V_O$ and 144 W output power. Furthermore, in the voltage converter 200 of the present application, the first capacitor module 210 and the second capacitor module 220 are in the enabled state, and the third capacitor module 230 is in the disabled state.

Please refer to the dotted lines shown in FIG. 2C. When the conventional voltage converter is operated in the first operating mode Mode1 (i.e., the charging mode), the inductor voltage $V_L$ is equal to +36V, i.e., $V_L=V_i-V_O=48-12$. Moreover, when the conventional voltage converter is operated in the second operating mode Mode2 (i.e., the discharging mode), the inductor voltage $V_L$ is equal to -12V. In the voltage converter 200 of the present application, the two capacitor modules 210 and 220 are in the enabled state. Please refer to the sloid lines shown in FIG. 2C. When the voltage converter 200 of the present application is operated in the first operating mode Mode1 (i.e., the charging mode), the inductor voltage $V_L$ is equal to +12V, i.e., $V_L=V_i-3V_O=48-36$. When the voltage converter 200 of the present application is operated in the second operating mode Mode2 (i.e., the discharging mode), the inductor voltage $V_L$ is equal to -5V. Obviously, in the first operating mode Mode1, the inductor voltage $V_L$ can be effectively reduced by using the voltage converter 200 of the present application. In other words, the highest voltage across the energy storage inductor L is reduced.

Please refer to the dotted lines shown in FIG. 2D. When the conventional voltage converter is operated in the first operating mode Mode1 (i.e., the charging mode), the highest inductor power P of the energy storage inductor L is +511 W. In the voltage converter 200 of the present application, the capacitor modules 210 and 220 are in the enabled state. Please refer to the sloid lines shown in FIG. 2D. When the voltage converter 200 of the present application is operated in the first operating mode Mode1 (i.e., the charging mode), the highest inductor power P of the energy storage inductor L is +89 W. Moreover, in the first operating mode Mode1 (i.e., the charging mode), the integration of the inductor power P with respect to the working time t can obtains the inductor storage energy of the voltage converter 200 of the present application. The comparison between the inductor storage energy of the conventional voltage converter and the inductor storage energy of the voltage converter 200 can also be seen. The inductor storage energy of the voltage converter 200 of the present application is lower than the inductor storage energy of the conventional voltage converter. For example, the highest storage energy of the conventional voltage converter in each cycle is 1077 µJ, and the highest storage energy of the voltage converter 200 of the present application in each cycle is 358 µJ. Obviously, the use of the present voltage converter 200 can effectively reduce the inductive energy conversion of the energy storage inductor L.

FIGS. 3A and 3B are schematic circuit diagrams illustrating the operations of the voltage converter of the present application, in which one capacitor module is enabled. The first capacitor module 210 is in the enabled state, and the second capacitor module 220 and the third capacitor module 230 are in the disabled state.

As shown in FIG. 3A, in the first operating mode Mode1, the switching element $SW_1$ is in the on state, and the switching element $SW_2$ is in the off state. In the first capacitor module 210, the first switching circuits $SW_{a1}$ is in the on state, the second switching circuits $SW_{a2}$ is in the off state, and the third switching circuit $SW_{a3}$ is in the off state. In this embodiment, the second capacitor module 220 and the third capacitor module 230 are in the disabled state. Consequently, in the second capacitor module 220 and the third capacitor module 230, the second switching circuits $SW_{b2}$ and $SW_{c2}$ are in the on state, the first switch circuits $SW_{b1}$ and $SW_{c1}$ are in the off state, and the third switching circuits $SW_{b3}$ and $SW_{c3}$ are in the off state. Under this circumstance, the energy storage inductor L, the energy storage capacitor $C_O$ and the capacitor $C_{a1}$ of the first capacitor module 210 are connected with each other in series. The power source 205 provides the input voltage $V_i$ to charge the energy storage inductor L, the energy storage capacitor $C_O$ and the capacitor $C_{a1}$. The inductor current $I_L$ of the energy storage inductor L increases. The inductor voltage $V_L$ is equal to $(V_i-2V_O)$, i.e., $V_L=V_i-2V_O$. In other words, the first operating mode Mode1 is a charging mode.

As shown in FIG. 3B, in the second operating mode Mode2, the switching element $SW_2$ is in the on state, and the switching element $SW_1$ is in the off state. In the first capacitor module 210, the first switching circuit $SW_{a1}$ is in the off state, the second switching circuit $SW_{a2}$ is in the on state, and the third switching circuit $SW_{a3}$ is in the on state. In this embodiment, the second capacitor module 220 and the third capacitor module 230 are in the disabled state. Consequently, in the second capacitor module 220 and the third capacitor module 230, the first switching circuits $SW_{b1}$ and $SW_{c1}$, the second switching circuits $SW_{b2}$ and $SW_{c2}$ and the third switching circuit $SW_{b3}$ and $SW_{c3}$ are in the off state. Under this circumstance, the energy storage inductor L, the energy storage capacitor $C_O$ and the capacitor $C_{a1}$ of the first capacitor module 210 are connected with each other in parallel. The energy storage inductor L discharges electricity. The inductor current $I_L$ of the energy storage inductor L is split into two currents $I_{L1}$, $I_{L2}$. That is, $I_{L1}=I_{L2}=I_L/2$. Meanwhile, the stored energy of the energy storage inductor L is transmitted to the energy storage capacitor $C_O$ and the capacitor $C_{a1}$. The inductor voltage $V_L$ of the energy storage inductor L is equal to $(-V_O)$. That is, $V_L=-V_O$. In other words, the second operating mode Mode2 is a discharging mode.

Obviously, when one capacitor module is enabled in the first operating mode Mode1, the inductor voltage $V_L$ can be effectively reduced by using the voltage converter 200 of the present application. Moreover, the use of the present voltage converter 200 can effectively reduce the inductive energy conversion of the energy storage inductor L.

In the above embodiment shown in FIG. 1A, the voltage converter 200 is equipped with three capacitor modules 210~230, which are connected with each other. It is noted that the number of capacitor modules in the voltage converters is not restricted. In other words, the voltage converter of the present application may be equipped with at least one capacitor module.

For example, the voltage converter comprises N capacitor modules, and the N capacitor modules are connected between the node c and the node d, wherein N is a positive integer.

For example, in the embodiment shown in FIG. 1A, the voltage converter 200 comprises at least two capacitor modules (e.g., N=3). In these capacitor modules, the first end of the first capacitor module is connected with the node c, the first end of each of the other capacitor modules is connected with the second end of the previous capacitor module, and the second end of the last capacitor module (i.e., the Nth capacitor module) is connected with the node d. Moreover, in case that the voltage converter 200 is equipped with a single capacitor module (i.e., N=1), the first end of the capacitor module is connected with the node c, and the second end of the capacitor module is connected with the node d.

Moreover, when the voltage converter is in the normal working state, M capacitor modules in the voltage converter may be selected to work. Under control of the controller, the M capacitor modules are in the enabled state, and the other (N-M) capacitor modules are in the disabled state, wherein M is a positive integer, and M is smaller than or equal to N.

In other words, when the voltage converter is operated in the first operating mode Mode1 (i.e., the charging mode), the M capacitors in the M enabled capacitor modules, the energy storage inductor L and the energy storage capacitor $C_O$ are connected with each other in series. Furthermore, the power source provides the input voltage $V_i$ to charge the M capacitors in the M enabled capacitor modules, the energy storage inductor L and the energy storage capacitor $C_O$.

Moreover, when the voltage converter is operated in the second operating mode Mode2 (i.e., the discharging mode), the M capacitors in the M enabled capacitor modules, the energy storage inductor L and the energy storage capacitor $C_O$ are connected with each other in parallel. The stored energy in the energy storage inductor L is transferred to the M capacitors in the M enabled capacitor modules and the energy storage capacitor $C_O$.

Figure 4:
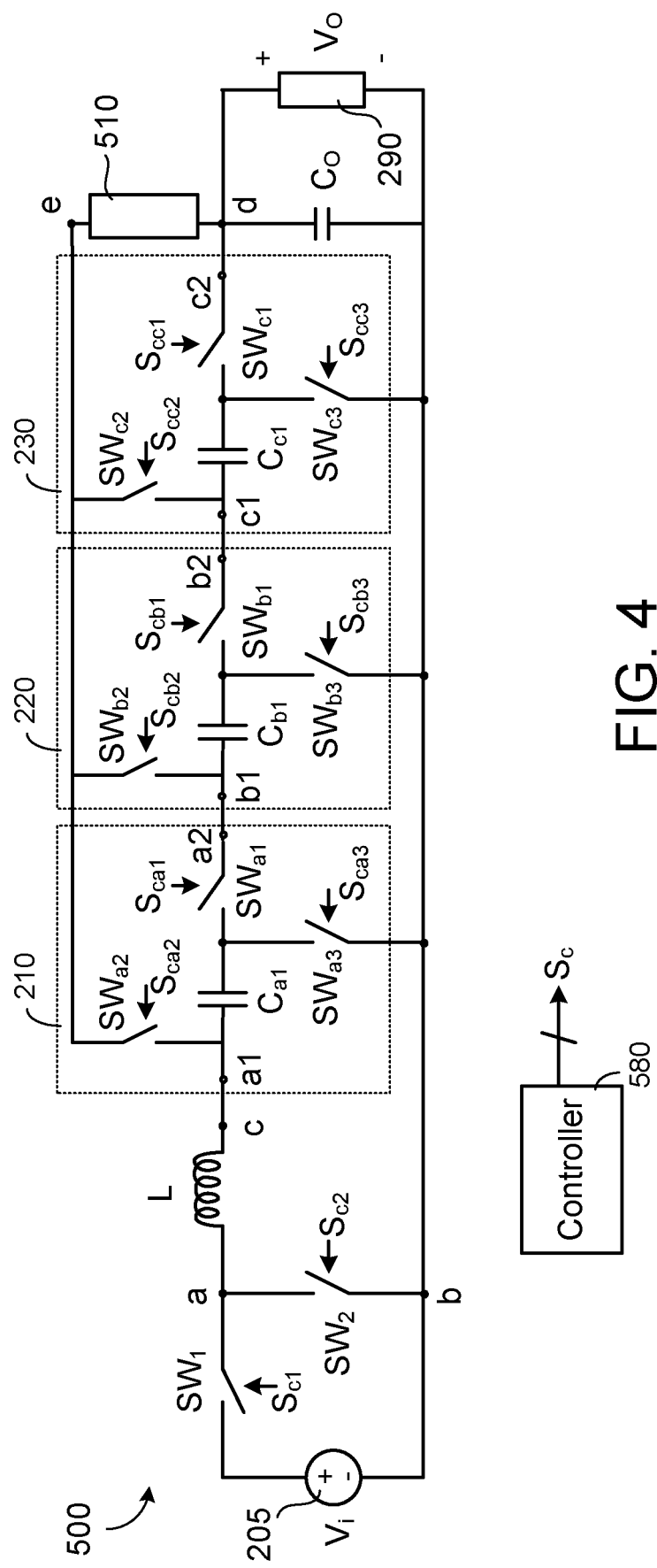
FIG. 4 is a schematic circuit diagram illustrating a voltage converter according to a second embodiment of the present application.

FIG. 4 is a schematic circuit diagram illustrating a voltage converter according to a second embodiment of the present application. In comparison with the voltage converter 200 of the first embodiment, the voltage converter 500 of the second embodiment further comprises a connecting element 510. The connecting element 510 is coupled between the node e and the node d. For example, the connecting element 510 is a switching element $SW_3$ or a short circuit element.

For example, in case that the connecting element 510 is a short circuit element, the node e and the node d are directly connected with each other. In other words, if the connecting element 510 is a short circuit element, the structure of the voltage converter 500 of the second embodiment is identical to the structure of the voltage converter 200 of the first embodiment. When the power converter 500 is operated in the first operating mode Mode1 or the second operating mode Mode2, the controller 580 generates the control signal set $S_c$ to control the switching elements $SW_1$ and $SW_2$ and the switching circuits $SW_{a1}$~$SW_{a3}$, $SW_{b1}$~$SW_{b3}$ and $SW_{c1}$~$SW_{c3}$.

Hereinafter, the switching element $SW_3$ is served as the connecting element 510 for illustration. The operations of the voltage converter 500 of the second embodiment will be illustrated as follows. The switching element $SW_3$ receives a control signal $S_{c3}$. The controller 580 generates a control signal set $S_c$. The control signal set $S_c$ contains plural control signals for controlling the connection statuses of the switching elements $SW_1$~$SW_3$ and the switching circuits $SW_{a1}$~$SW_{a3}$, $SW_{b1}$~$SW_{b3}$ and $SW_{c1}$~$SW_{c3}$ in the voltage converter 500.

In the second embodiment, the arrangement of the switching element $SW_3$ in the voltage converter 500 make the operations of the voltage converter 500 more flexible. For example, in case that one capacitor module in the voltage converter 200 of the first embodiment is selected to work, only the first capacitor module 210 can be selected to be in the enabled state because of the circuitry design and current flowing direction. However, in case that one capacitor module in the voltage converter 500 of the second embodiment is selected to work, either first capacitor module 210 or the third capacitor module 230 can be flexibly selected to be in the enabled state.

Furthermore, in case that two capacitor modules in the voltage converter 200 of the first embodiment are selected to work, only the first capacitor module 210 and the second capacitor module 220 can be selected to be in the enabled state because of the circuitry design and current flowing direction. However, in case two capacitor modules in the voltage converter 500 of the second embodiment are selected to work, any two of the first capacitor module 210, the second capacitor module 220 and the third capacitor module 230 can be flexibly selected to be in the enabled state. The reasons will be described in more details as follows.

Figure 5A:
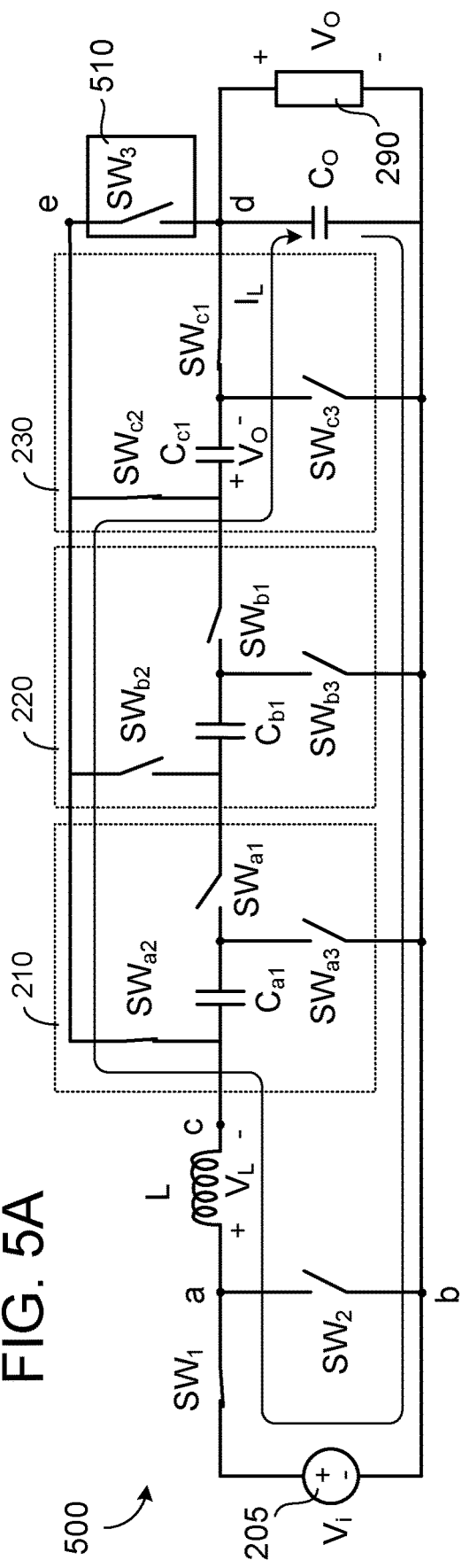
FIGS. 5A and 5B are schematic circuit diagrams illustrating the operations of the voltage converter of the second embodiment, in which the third capacitor module is selected to be in the enabled state.
Figure 5B:
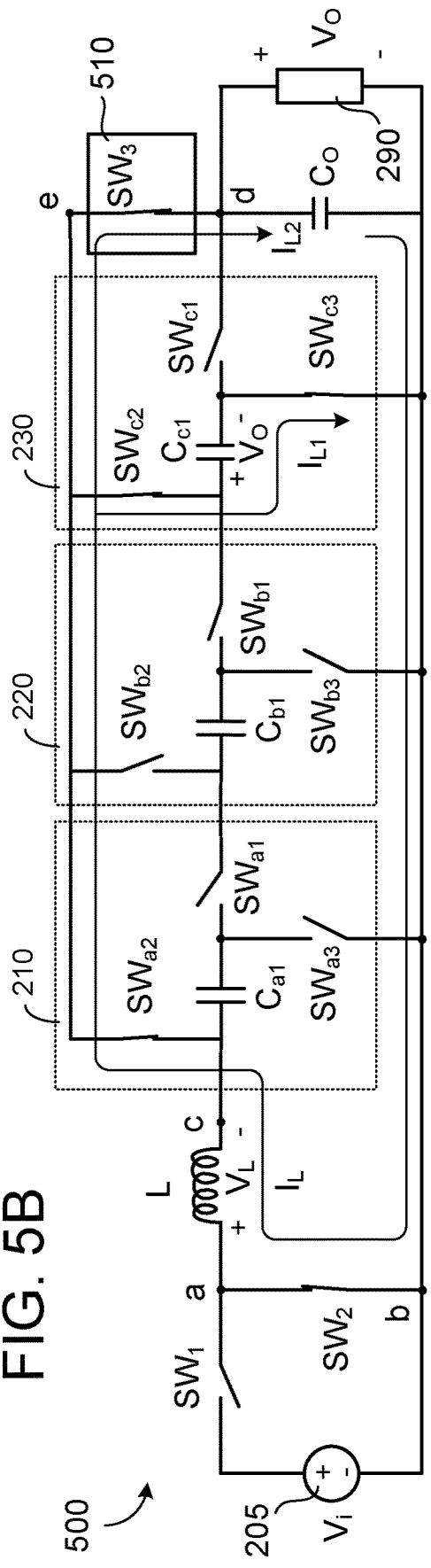

FIGS. 5A and 5B are schematic circuit diagrams illustrating the operations of the voltage converter of the second embodiment, in which the third capacitor module is selected to be in the enabled state.

As shown in FIG. 5A, in the first operating mode Mode1, the switching element $SW_1$ is in the on state, the switching element $SW_2$ is in the off state, and the switching element $SW_3$ as the connecting element 510 is in the off state. In this embodiment, the first capacitor module 210 and the second capacitor module 230 are disabled. In the first capacitor module 210, the second switching circuit $SW_{a2}$ is in the on state, and the first switching circuit $SW_{a1}$ and the third switching circuit $SW_{a3}$ are in the off state. In the second capacitor module 220, the three switching circuits $SW_{b1}$~$SW_{b3}$ are in the off state. In the third capacitor module 230, the first switching circuit $SW_{c1}$ and the second switching circuit $SW_{c2}$ are in the on state, and the third switching circuit $SW_{c3}$ is in the off state. Under this circumstance, the energy storage inductor L, the energy storage capacitor $C_O$ and the capacitor $C_{c1}$ of the third capacitor module 230 are connected with each other in series. The power source 205 provides the input voltage $V_i$ to charge the energy storage inductor L, the energy storage capacitor $C_O$ and the capacitor $C_{c1}$. The inductor current $I_L$ of the energy storage inductor L increases. The inductor voltage $V_L$ is equal to $(V_i-2V_O)$, i.e., $V_L=V_i-2V_O$. In other words, the first operating mode Mode1 is a charging mode.

As shown in FIG. 5B, in the second operating mode Mode2, the switching element $SW_2$ is in the on state, the switching element $SW_1$ is in the off state, and the switching element $SW_3$ as the connecting element 510 is in the on state. In this embodiment, the first capacitor module 210 and the second capacitor module 220 are disabled. In the first capacitor module 210, the second switching circuit $SW_{a2}$ is in the on state, the first switching circuit $SW_{a1}$ and the third switching circuit $SW_{a3}$ are in the off state. In the second capacitor module 220, the three switching circuits $SW_{b1}$~$SW_{b3}$ are in the off state. In the third capacitor module 230, the first switching circuit $SW_{c1}$ is in the off state, and the second switching circuit $SW_{c2}$ and the third switching circuit $SW_{c3}$ are in the on state. Under this circumstance, the energy storage inductor L, the energy storage capacitor $C_O$ and the capacitor $C_{c1}$ of the third capacitor module 230 are connected with each other in parallel. The energy storage inductor L discharges electricity. The inductor current $I_L$ of the energy storage inductor L is split into two currents $I_{L1}$ and $I_{L2}$. That is, $I_{L1}=I_{L2}=I_L/2$. Meanwhile, the stored energy of the energy storage inductor L is transferred to the energy storage capacitor $C_O$ and the capacitor $C_{c1}$. The inductor voltage $V_L$ of the energy storage inductor L is equal to $(-V_O)$. That is, $V_L=-V_O$. In other words, the second operating mode Mode2 is a discharging mode.

FIGS. 6A and 6B are schematic circuit diagrams illustrating the operations of the voltage converter of the second embodiment, in which the first capacitor module and the third capacitor module are selected to be in the enabled state.

As shown in FIG. 6A, in the first operating mode Mode1, the switching element $SW_1$ is in the on state, the switching element $SW_2$ is in the off state, and the switching element $SW_3$ as the connecting element 510 is in the off state. In the first capacitor module 210, the first switching circuit $SW_{a1}$ is in the on state, the second switching circuit $SW_{a2}$ and the third switching circuit $SW_{a3}$ are in the off state. In this embodiment, the second capacitor module 220 is disabled. Consequently, in the second capacitor module 220, the second switching circuit $SW_{b2}$ is in the on state, and the first switching circuit $SW_{b1}$ and the third switch circuit $SW_{b3}$ are in the off state. In the third capacitor module 230, the first switching circuit $SW_{c1}$ and the second switching circuit $SW_{c2}$ are in the on state, and the third switching circuit $SW_{c3}$ is in the off state. Under this circumstance, the energy storage inductor L, the energy storage capacitor $C_O$, the capacitor $C_{a1}$ of the first capacitor module 210 and the capacitor $C_{c1}$ of the third capacitor module 230 are connected with each other in series. The power source 205 charges the energy storage inductor L, the energy storage capacitor $C_O$ and the capacitors $C_{a1}$ and $C_{c1}$. The inductor current $I_L$ of the energy storage inductor L increases. The inductor voltage $V_L$ is equal to $(V_i-3V_O)$, i.e., $V_L=V_i-3V_O$. In other words, the first operating mode Mode1 is a charging mode.

As shown in FIG. 6B, in the second operating mode Mode2, the switching element $SW_2$ is in the on state, the switching element $SW_1$ is in the off state, and the switching element $SW_3$ as the connecting element 510 is in the on state. In the first capacitor module 210, the first switching circuit $SW_{a1}$ is in the off state, the second switching circuit $SW_{a2}$ and the third switching circuit $SW_{a3}$ are in the on state. In this embodiment, the second capacitor module 220 is disabled. Consequently, in the second capacitor module 220, the three switching circuits $SW_{b1}$~$SW_{b3}$ are in the off state. In the third capacitor module 230, the first switching circuit $SW_{c1}$ is in the off state, and the second switching circuit $SW_{c2}$ and the third switching circuit $SW_{c3}$ are in the on state. Under this circumstance, the energy storage inductor L, the energy storage capacitor $C_O$, the capacitor $C_{a1}$ of the first capacitor module 210 and the capacitor $C_{c1}$ of the third capacitor module 230 are connected with each other in parallel. The energy storage inductor L discharges electricity. The inductor current $I_L$ of the energy storage inductor L is split into three currents $I_{L1}$, $I_{L2}$ and $I_{L3}$. That is, $I_{L1}=I_{L2}=I_{L3}=I_L/3$. Meanwhile, the stored energy of the energy storage inductor L is transferred to the energy storage capacitor $C_O$ and the capacitors $C_{a1}$ and $C_{c1}$. The inductor voltage $V_L$ of the energy storage inductor L is equal to $(-V_O)$. That is, $V_L=-V_O$. In other words, the second operating mode Mode2 is a discharging mode.

Figure 7A:
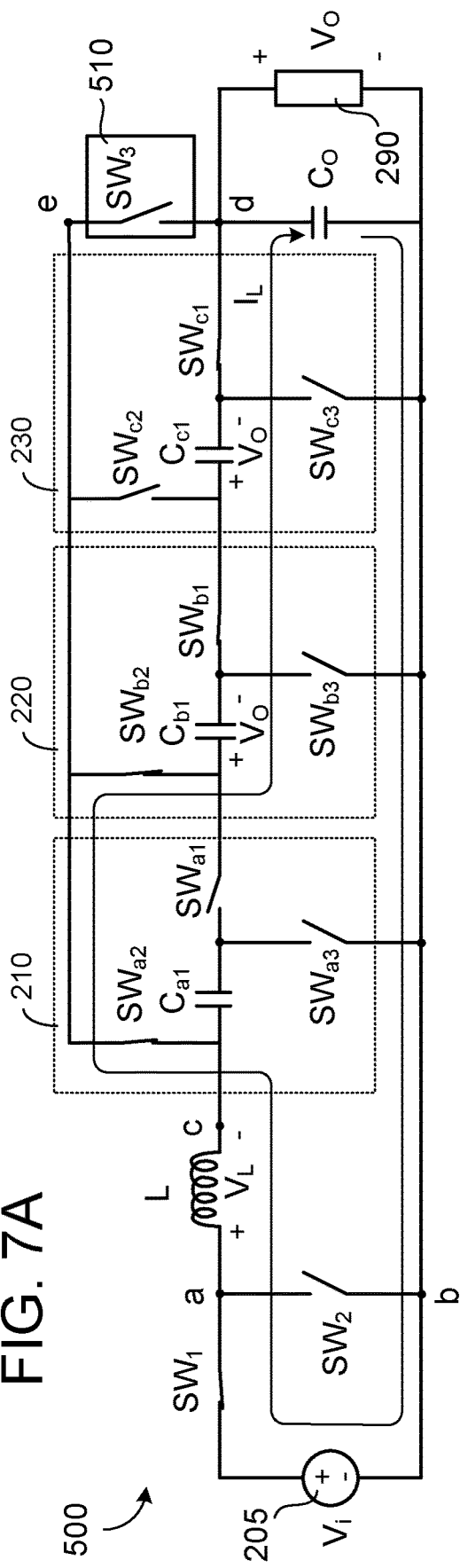
FIGS. 7A and 7B are schematic circuit diagrams illustrating the operations of the voltage converter of the second embodiment, in which the second capacitor module and the third capacitor module are selected to be in the enabled state.
Figure 7B:
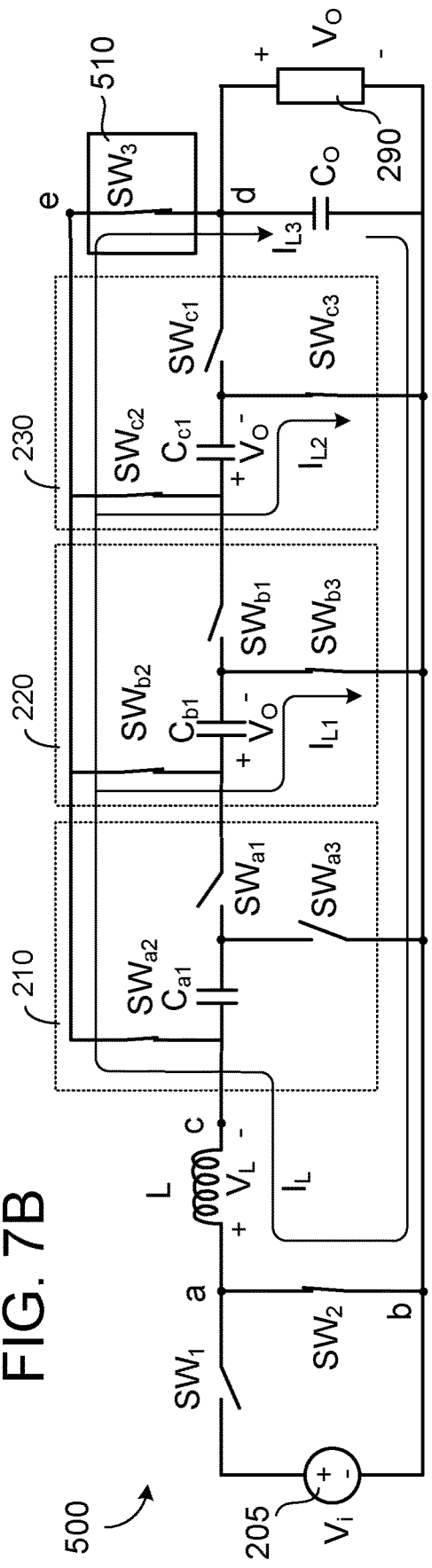

FIGS. 7A and 7B are schematic circuit diagrams illustrating the operations of the voltage converter of the second embodiment, in which the second capacitor module and the third capacitor module are selected to be in the enabled state.

As shown in FIG. 7A, in the first operating mode Mode1, the switching element $SW_1$ is in the on state, the switching element $SW_2$ is in the off state, and the switching element $SW_3$ as the connecting element 510 is in the off state. In this embodiment, the first capacitor module 210 is disabled. Consequently, in the first capacitor module 210, the second switching circuit $SW_{a2}$ is in the on state, and the first switching circuit $SW_{a1}$ and the third switching circuit $SW_{a3}$ are in the off state. In the second capacitor module 220, the third switching circuit $SW_{b3}$ is in the off state, the first switching circuit $SW_{b1}$ and the second switch circuit $SW_{b2}$ are in the off state. In the third capacitor module 230, the first switching circuit $SW_{c1}$ is in the on state, and the second switching circuit $SW_{c2}$ and the third switching circuit $SW_{c3}$ is in the off state. Under this circumstance, the energy storage inductor L, the energy storage capacitor $C_O$, the capacitor $C_{b1}$ of the second capacitor module 220 and the capacitor $C_{c1}$ of the third capacitor module 230 are connected with each other in series. The power source 205 provides the input voltage $V_i$ to charge the energy storage inductor L, the energy storage capacitor $C_O$ and the capacitors $C_{b1}$ and $C_{c1}$. The inductor current $I_L$ of the energy storage inductor L increases. The inductor voltage $V_L$ is equal to $(V_i-3V_O)$, i.e., $V_L=V_i-3V_O$. In other words, the first operating mode Mode1 is a charging mode.

As shown in FIG. 7B, in the second operating mode Mode2, the switching element $SW_2$ is in the on state, the switching element $SW_1$ is in the off state, and the switching element $SW_3$ as the connecting element 510 is in the on state. In this embodiment, the first capacitor module 210 is disabled. Consequently, in the first capacitor module 210, the second switching circuit $SW_{a2}$ is in the on state, and the first switching circuit $SW_{a1}$ and the third switching circuit $SW_{a3}$ are in the off state. In the second capacitor module 220, the first switching circuit $SW_{b1}$ is in the off state, and the second switching circuit $SW_{b2}$ and the third switching circuit $SW_{b3}$ are in the on state. In the third capacitor module 230, the first switching circuit $SW_{c1}$ is in the off state, and the second switching circuit $SW_{c2}$ and the third switching circuit $SW_{c3}$ are in the on state. Under this circumstance, the energy storage inductor L, the energy storage capacitor $C_O$, the capacitor $C_{b1}$ of the second capacitor module 220 and the capacitor $C_{c1}$ of the third capacitor module 230 are connected with each other in parallel. The energy storage inductor L discharges electricity. The inductor current $I_L$ of the energy storage inductor L is split into three currents $I_{L1}$, $I_{L2}$ and $I_{L3}$. That is, $I_{L1}=I_{L2}=I_{L3}=I_L/3$. Meanwhile, the stored energy of the energy storage inductor L is transferred to the energy storage capacitor $C_O$ and the capacitors $C_{b1}$ and $C_{c1}$. The inductor voltage $V_L$ of the energy storage inductor L is equal to $(-V_O)$. That is, $V_L=-V_O$. In other words, the second operating mode Mode2 is a discharging mode.

In the voltage converter 200 of the first embodiment and the voltage converter 500 of the second embodiment, the input voltage $V_i$ provided by the power source 205 is a DC voltage. In some other embodiment, the input voltage $V_i$ provided by the power source 205 is a rectified voltage. Furthermore, in the voltage converters 200 and 500, the number of the selected capacitor modules may be determined according to the relationship between the rectified voltage and the output voltage. Consequently, the performance of the voltage converter is enhanced.

In an embodiment, the maximum number of the selected capacitor modules in the voltage converter is expressed as: $M=[V_i/V_O-1]$. That is, after the decimal of calculated value in brackets is unconditionally discarded, the integer M is obtained. In this context, the maximum number of the selected capacitor modules represents the largest number of enabled capacitor modules for reducing the stored energy in the energy storage inductor L to the minimum value. In practice, a smaller number of capacitor modules (e.g., less than M capacitor modules) are used in the voltage converter. Even if less than M capacitor modules are used in the voltage converter of the present application, the efficacy of reducing the stored energy in the energy storage inductor L is enhanced when compared with the conventional voltage converter. Generally, in case that the voltage converter is a DC-DC voltage converter, the input voltage is fixed voltage. Under this circumstance, the maximum number of the selected capacitor modules in the voltage converter is feasible. However, in case that the input voltage of the voltage converter is a rectified voltage, which is obtained through the rectification of an AC voltage, the input voltage is not fixed. Under this circumstance, the number of the enabled capacitor modules can be dynamically determined according to the voltage value of the rectified voltage.

FIG. 8 is a schematic timing waveform diagram illustrating the input voltage provided by a non-constant voltage power source. In this embodiment, the power source 205 comprises a full-wave rectifier for converting the AC voltage into the input voltage $V_i$, and the input voltage $V_i$ is a rectified voltage. In FIG. 8, $V_{PK}$ denotes the peak voltage of the rectified voltage. Preferably but not exclusively, if the input voltage $V_i$ is in the range between $4\times V_O$ and $5\times V_O$, at most three capacitor modules in the voltage converter are selected to be in the enabled state (i.e., M=3). Preferably but not exclusively, if the input voltage $V_i$ is in the range between $3\times V_O$ and $4\times V_O$, at most two capacitor modules in the voltage converter are selected to be in the enabled state (i.e., M=2). Preferably but not exclusively, if the input voltage $V_i$ is in the range between $2\times V_O$ and $3\times V_O$, at most one capacitor module in the voltage converter is selected to be in the enabled state (i.e., M=1). If the input voltage $V_i$ is in the range between $1\times V_O$ and $2\times V_O$, all capacitor modules in the voltage converter are selected to be in the disabled state (i.e., M=0).

For example, the output voltage $V_O$ is +40V. If the rectified voltage (i.e., the input voltage $V_i$) is in the range between 40V and 80V, zero capacitor module (i.e., M=0) in the voltage converter can be selected to work. If the rectified voltage (i.e., the input voltage $V_i$) is in the range between 80V and 120V, one capacitor module (i.e., M=1) in the voltage converter can be selected to work. If the rectified voltage (i.e., the input voltage $V_i$) is in the range between 120V and 160V, two capacitor modules (i.e., M=2) in the voltage converter can be selected to work. If the rectified voltage (i.e., the input voltage $V_i$) is in the range between 160V and 200V, three capacitor modules (i.e., M=3) in the voltage converter can be selected to work.

Furthermore, in the voltage converter 200 of the first embodiment and the voltage converter 500 of the second embodiment, the switching elements $SW_1$, $SW_2$ and $SW_3$ and the switching circuits $SW_{a1} \sim SW_{a3}$, $SW_{b1} \sim SW_{b3}$ and $SW_{c1} \sim SW_{c3}$ can be implemented with various active switches. For example, the active switches include power MOSFET transistors, IGBT transistors, GaN MOSFET transistors, SiC MOSFET transistors or any other appropriate power transistors. In some other embodiments, the switching element $SW_2$ is implemented with a diode. In the following embodiment, the capacitor module with power transistors as the switching circuits will be illustrated.

FIG. 9 is a schematic circuit diagram illustrating a capacitor module using power transistors. The capacitor module 700 comprises a first end a1, a second end a2, a capacitor $C_1$, a first transistor $Q_1$, a second transistor $Q_2$ and a third transistor $Q_3$. Each of the transistor $Q_1 \sim Q_3$ comprises a first drain/source terminal, a second drain/source terminal and a gate terminal.

The first end a1 of the capacitor module 700 is connected with the first terminal of the capacitor $C_1$. The first drain/source terminal of the first transistor $Q_1$ is connected with the second terminal of the capacitor $C_1$. The second drain/source terminal of the first transistor $Q_1$ is connected with the second end a2 of the capacitor module 700. The gate terminal of the first transistor $Q_1$ receives the control signal $S_{ca1}$. The first drain/source terminal of the second transistor $Q_2$ is connected with the first end a1 of the capacitor module 700. The gate terminal of the second transistor $Q_2$ receives the control signal $S_{ca2}$. The first drain/source terminal of the third transistor $Q_3$ is connected with the second terminal of the capacitor $C_1$. The gate terminal of the third transistor $Q_3$ receives the control signal $S_{ca3}$. Moreover, the second drain/source terminal of the second transistor $Q_2$ is connected with the node e of the voltage converter, and the second drain/source terminal of the third transistor $Q_3$ is connected with the node b of the voltage converter. In practice, any of the capacitor modules 210~230 can be implemented with the capacitor module 700.

FIG. 10A is a schematic circuit diagram illustrating a voltage converter according to a third embodiment of the present application. In comparison with the voltage converter 200 of the first embodiment, the voltage converter 900 of the third embodiment is not equipped with the energy storage capacitor L and the second switching element $SW_2$. In addition, the node a is directly connected with the first end a1 of the first capacitor module 210. The connection relationships between associated components of the voltage converter 900 of the third embodiment are similar to those of the first embodiment, and not redundantly described herein.

Similarly, the controller 280 generates a control signal set $S_c$. The control signal set $S_c$ contains plural control signals $S_{c1}$, $S_{ca1}$~$S_{ca3}$, $S_{cb1}$~$S_{cb3}$ and $S_{cc1}$~$S_{cc3}$ for controlling the connection statuses of the switching element $SW_1$ and the switching circuits $SW_{a1}$~$SW_{a3}$, $SW_{b1}$~$SW_{b3}$ and $SW_{c1}$~$SW_{c3}$ in the voltage converter 900. Consequently, any number of capacitor modules in the voltage converter 900 of the third embodiment can be selected to work. For succinctness, the voltage converter 900 with three enabled capacitor modules will be illustrated as follows. For brevity, the descriptions about the operations of the controller 280 and the control signals $S_{c1}$~$S_{c2}$, $S_{ca1}$~$S_{ca3}$, $S_{cb1}$~$S_{cb3}$ and $S_{cc1}$~$S_{cc3}$ are omitted. In order words, only the states of the switching elements $SW_1$~$SW_2$ and the switching circuits $SW_{a1}$~$SW_{a3}$, $SW_{b1}$~$SW_{b3}$ and $SW_{c1}$~$SW_{c3}$ will be described as follows.

Figure 10B:
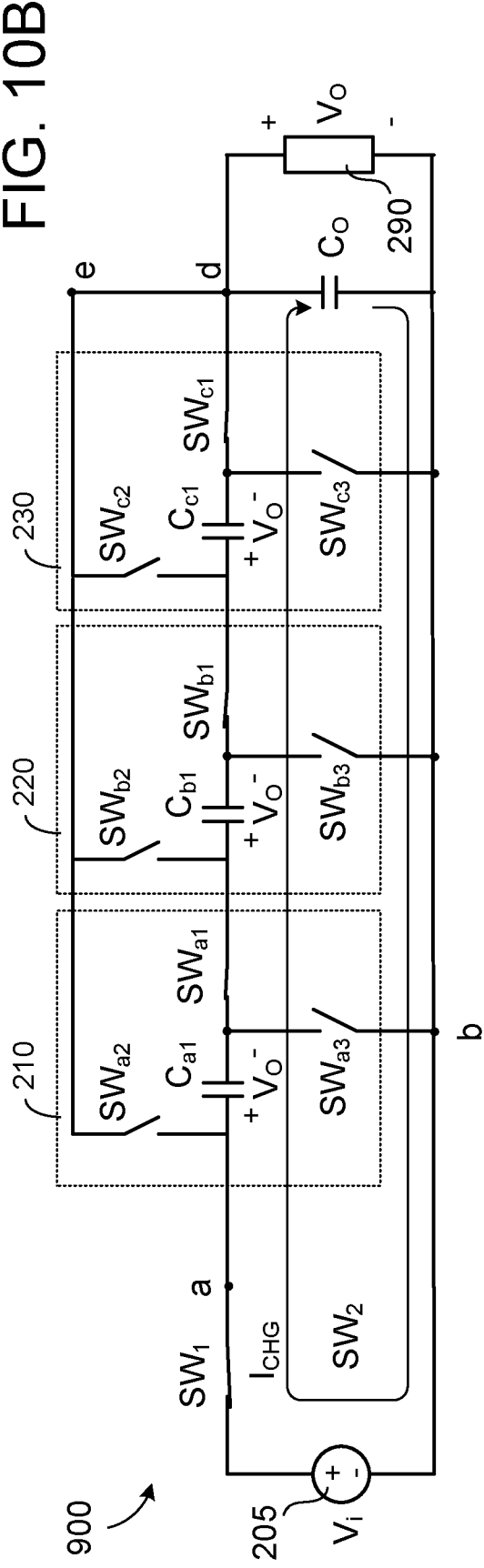
FIGS. 10B and 10C are schematic circuit diagrams illustrating the operations of the voltage converter of the third embodiment.
Figure 10C:
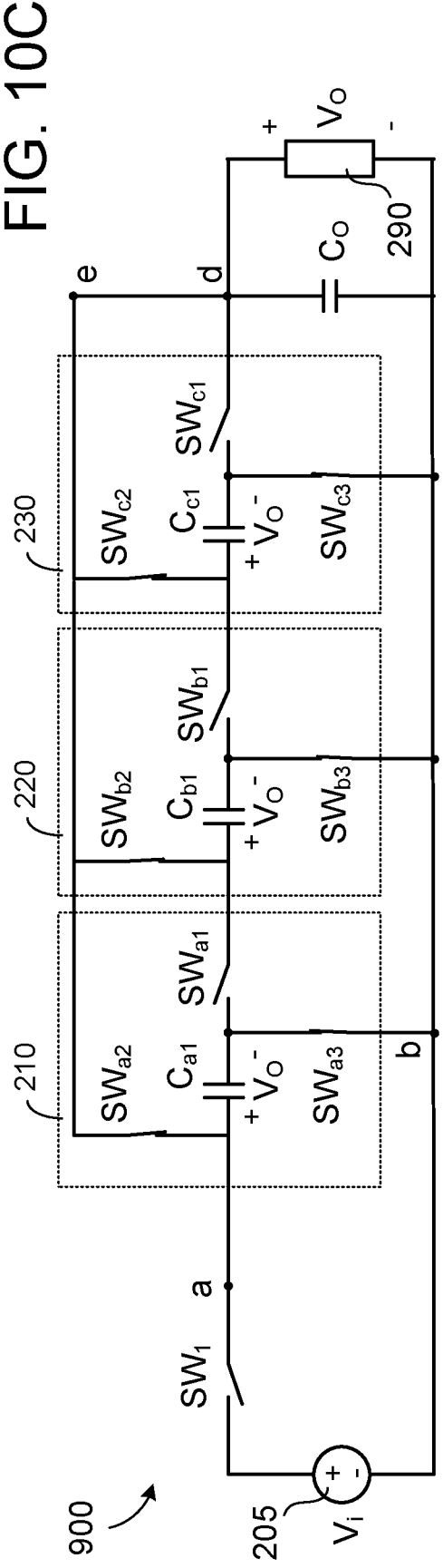

FIGS. 10B and 10C are schematic circuit diagrams illustrating the operations of the voltage converter of the third embodiment. When the voltage converter 900 is in the normal working state, the operating mode of the voltage converter 900 is switched between a first operating mode Mode1 and a second operating mode Mode2.

As shown in FIG. 10B, in the first operating mode Mode1, the switching element $SW_1$ is in the on state. In the three capacitor modules 210, 220 and 230, the first switching circuits $SW_{a1}$, $SW_{b1}$ and $SW_{c1}$ are in the on state, the second switching circuits $SW_{a2}$, $SW_{b2}$ and $SW_{c2}$ are in the off state, and the third switching circuits $SW_{a3}$, $SW_{b3}$ and $SW_{c3}$ are in the off state. Under this circumstance, the energy storage capacitor $C_O$ and the capacitors $C_{a1}$, $C_{b1}$ and $C_{c1}$ of the capacitor modules 210, 220 and 230 are connected with each other in series. The input voltage $V_i$ of the power source 205 provides a charging current $I_{CHG}$ to charge the energy storage capacitor $C_O$ and the capacitors $C_{a1}$, $C_{b1}$ and $C_{c1}$.

Meanwhile, the output voltage $V_O$ of the voltage converter 900 is equal to ¼ of the input voltage $V_i$, i.e., $V_i=4V_O$.

As shown in FIG. 10C, in the second operating mode Mode2, the switching element $SW_1$ is in the off state. In the three capacitor modules 210, 220 and 230, the first switching circuits $SW_{a1}$, $SW_{b1}$ and $SW_{c1}$ are in the off state, the second switching circuits $SW_{a2}$, $SW_{b2}$ and $SW_{c2}$ are in the on state, and the third switching circuits $SW_{a3}$, $SW_{b3}$ and $SW_{c3}$ are in the on state. Under this circumstance, the energy storage capacitor $C_O$ and the capacitors $C_{a1}$, $C_{b1}$ and $C_{c1}$ of the capacitor modules 210, 220 and 230 are connected with each other in parallel.

From the above descriptions, the present application provides a voltage converter. When the voltage converter 200 of the first embodiment or the voltage converter 500 of the second embodiment is in the first operating mode Mode1 (i.e., the charging mode), the energy storage inductor L, the energy storage capacitor and the capacitors of the capacitor modules are connected with each other in series to define a charging path. Consequently, the inductor voltage $V_L$ of the energy storage inductor L is reduced. When the voltage converter 200 of the first embodiment or the voltage converter 500 of the second embodiment is in the second operating mode Mode2 (i.e., the discharging mode), the energy storage inductor L, the energy storage capacitor and the capacitors of the capacitor modules are connected with each other in parallel. Consequently, the stored energy in the energy storage inductor L is transferred to the capacitors of the capacitor modules. When the voltage converter 900 of the third embodiment is in the first operating mode Mode1 (i.e., the charging mode), the energy storage capacitor and the capacitors of the capacitor modules are connected with each other in series to define a charging path. When the voltage converter 900 of the third embodiment is in the second operating mode Mode2 (i.e., the discharging mode), the energy storage capacitor and the capacitors of the capacitor modules are connected with each other in parallel.

While the application has been described in terms of what is presently considered to be the most practical and preferred embodiments, it is to be understood that the application needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage converter connected with a load, the voltage converter providing an output voltage to the load, the voltage converter comprising:

a power source providing an input voltage;

a first switching element connected between a first terminal of the power source and a first node;

a second switching element connected between the first node and a second node, wherein a second terminal of the power source is connected with the second node;

an energy storage inductor connected between the first node and a third node;

N capacitor modules connected between the third node and a fourth node, wherein N is a positive integer; and an energy storage capacitor, wherein a first terminal of the energy storage capacitor is connected to the second node and a second terminal of the energy storage capacitor is directly connected to the fourth node, wherein the load is connected between the second node and the fourth node, wherein each of the N capacitor modules comprises a capacitor, wherein when the voltage converter is in a first operating mode, a connection relationship between the N capacitor modules is controlled, and the energy storage inductor, the energy storage capacitor and the N capacitors of the N capacitor modules are connected with each other in series, so that the energy storage inductor, the energy storage capacitor and the N capacitors are charged by the input voltage, wherein when the voltage converter is in a second operating mode, the connection relationship between the N capacitor modules is controlled, and the energy storage inductor, the energy storage capacitor and the N capacitors of the N capacitor modules are connected with each other in parallel, so that the energy storage inductor discharges electricity and a stored energy in the energy storage inductor is transferred to the energy storage capacitor and the N capacitors, wherein during operation of the voltage converter, M capacitor modules in the voltage converter are selected to work, wherein the M capacitor modules in the voltage converter are controlled to be in an enabled state, and (N−M) capacitor modules in the voltage converter are controlled to be in a disabled state, wherein M is a positive integer, and M is smaller than or equal to N;

wherein each of the N capacitor modules further comprises a first end, a second end, a first switching circuit, a second switching circuit and a third switching circuit, wherein a first terminal of the capacitor is connected with the first end, the first switching circuit is connected between a second terminal of the capacitor and the second end, the second switching circuit is connected between the first end and a fifth node, and the third switching circuit is connected between the second terminal of the capacitor and the second node, wherein the fourth node is coupled with the fifth node, and wherein the voltage converter further comprises a connecting element, wherein the connecting element is coupled between the fourth node and the fifth node, and the connecting element is a third switching element or a short circuit element.

2. The voltage converter as claimed in claim 1, wherein if N is equal to 1, the first end of the capacitor module is connected with the third node, and the second end of the capacitor module is connected with the fourth node.

3. The voltage converter as claimed in claim 1, wherein if N is larger than 1, the first end of a first capacitor module of the N capacitor modules is connected with the third node, the first end of each of the other capacitor modules is connected with the second end of a previous capacitor module, and the second end of a Nth capacitor module is connected with the fourth node.

4. The voltage converter as claimed in claim 1, wherein the voltage converter further comprises a controller, and the controller generates a control signal set, wherein a connection relationship between the first switching element, the second switching element and the first switching circuit, the second switching circuit and the third switching circuit in each of the N capacitor modules is controlled according to the control signal set, so that the N capacitors are selectively connected with the energy storage inductor and the energy storage capacitor in series or in parallel.

5. The voltage converter as claimed in claim 1, wherein when the voltage converter is in the first operating mode, the M capacitors of the M capacitor modules in the enabled state, the energy storage inductor and the energy storage capacitor are connected with each other in series, and the power source provides the input voltage to charge the M capacitors of the M capacitor modules in the enabled state, the energy storage inductor and the energy storage capacitor, wherein when the voltage converter is in the second operating mode, the M capacitors of the M capacitor modules in the enabled state, the energy storage inductor and the energy storage capacitor are connected with each other in parallel, and the stored energy in the energy storage inductor is transferred to the M capacitors of the M capacitor modules in the enabled state and the energy storage capacitor.

6. The voltage converter as claimed in claim 1, wherein the input voltage is a rectified voltage, and a number of the M capacitor modules in the enabled state is dynamically adjusted according to a voltage value of the rectified voltage.

7. A voltage converter connected with a load, the voltage converter providing an output voltage to the load, the voltage converter comprising:

a power source providing an input voltage;

a first switching element connected between a first terminal of the power source and a first node;

an energy storage capacitor, wherein a first terminal of the energy storage capacitor is connected to a second node and a second terminal of the energy storage capacitor is directly connected to a third node, wherein a second terminal of the power source is connected with the second node; and N capacitor modules connected between the first node and the third node, wherein N is a positive integer, wherein each of the N capacitor modules comprises a capacitor, wherein when the voltage converter is in a first operating mode, a connection relationship between the N capacitor modules is controlled, and the energy storage capacitor and the N capacitors of the N capacitor modules are connected with each other in series, so that the energy storage capacitor and the N capacitors are charged by the input voltage, wherein when the voltage converter is in a second operating mode, the connection relationship between the N capacitor modules is controlled, and the energy storage capacitor and the N capacitors of the N capacitor modules are connected with each other in parallel, wherein during operation of the voltage converter, M capacitor modules in the voltage converter are selected to work, wherein the M capacitor modules in the voltage converter are controlled to be in an enabled state, and (N−M) capacitor modules in the voltage converter are controlled to be in a disabled state, wherein M is a positive integer, and M is smaller than or equal to N, wherein each of the N capacitor modules further comprises a first end, a second end, a first switching circuit, a second switching circuit and a third switching circuit, wherein a first terminal of the capacitor is connected with the first end, the first switching circuit is connected between a second terminal of the capacitor and the second end, the second switching circuit is connected between the first end and a fourth node, and the third switching circuit is connected between the second terminal of the capacitor and the second node, wherein the third node is coupled with the fourth node, and wherein the voltage converter further comprises a connecting element, wherein the connecting element is coupled between the third node and the fourth node, and the connecting element is a third switching element or a short circuit element.

* * * * *